(12) United States Patent
Kim

(10) Patent No.: US 9,079,073 B2
(45) Date of Patent: Jul. 14, 2015

(54) PROCESS FOR DESIGNING DIMPLE PATTERN OF GOLF BALL

(71) Applicant: DUNLOP SPORTS CO. LTD., Kobe-shi, Hyogo (JP)

(72) Inventor: Hyoungchol Kim, Kobe (JP)

(73) Assignee: DUNLOP SPORTS CO. LTD., Kobe-shi (JP)

( * ) Notice: Subject to any disclaimer, the term of this patent is extended or adjusted under 35 U.S.C. 154(b) by 81 days.

(21) Appl. No.: 13/659,119

(22) Filed: Oct. 24, 2012

(65) Prior Publication Data

US 2013/0102417 A1    Apr. 25, 2013

(30) Foreign Application Priority Data

Oct. 25, 2011   (JP) ................. 2011-233477

(51) Int. Cl.
    *A63B 37/12*    (2006.01)
    *A63B 37/00*    (2006.01)
    *G06T 17/20*    (2006.01)

(52) U.S. Cl.
    CPC ........... *A63B 37/0006* (2013.01); *A63B 37/002* (2013.01); *G06T 17/20* (2013.01); *A63B 37/0018* (2013.01); *A63B 37/0021* (2013.01)

(58) Field of Classification Search
    CPC .................................................. A63B 7/0006
    USPC ........................................................ 473/378
    See application file for complete search history.

(56) References Cited

U.S. PATENT DOCUMENTS

| | | | |
|---|---|---|---|
| 4,729,861 A * | 3/1988 | Lynch et al. | 264/219 |
| 4,744,564 A | 5/1988 | Yamada | |
| 4,936,587 A | 6/1990 | Lynch et al. | |
| 5,080,367 A | 1/1992 | Lynch et al. | |
| 5,688,194 A * | 11/1997 | Stiefel et al. | 473/383 |
| 5,772,532 A | 6/1998 | Stiefel et al. | |
| 6,254,496 B1 * | 7/2001 | Maehara et al. | 473/378 |
| 6,702,696 B1 * | 3/2004 | Nardacci | 473/383 |
| 2002/0019275 A1 * | 2/2002 | Winfield et al. | 473/378 |
| 2005/0176525 A1 * | 8/2005 | Nardacci | 473/378 |
| 2010/0234141 A1 | 9/2010 | Kim et al. | |
| 2011/0034274 A1 * | 2/2011 | Sajima et al. | 473/384 |

* cited by examiner

*Primary Examiner* — John E Simms, Jr.
(74) *Attorney, Agent, or Firm* — Birch, Stewart, Kolasch & Birch, LLP

(57) ABSTRACT

A golf ball 2 has, on a surface thereof, a dimple pattern consisting of a land 10 and a large number of dimples 8. A process for designing the dimple pattern includes the steps of:
(1) randomly arranging a large number of points on the surface of a phantom sphere;
(2) calculating a distance between a first point and a second point which is a point closest to the first point;
(3) deciding a radius on the basis of the distance;
(4) assuming a circle which has a center at the first point and has the radius; and
(5) assuming a dimple 8 whose contour coincides with the circle.

3 Claims, 25 Drawing Sheets

PROCESS FOR DESIGNING DIMPLE PATTERN OF GOLF BALL

This application claims priority on Patent Application No. 2011-233477 filed in JAPAN on Oct. 25, 2011. The entire contents of this Japanese Patent Application are hereby incorporated by reference.

BACKGROUND OF THE INVENTION

1. Field of the Invention

The present invention relates to golf balls. Specifically, the present invention relates to processes for designing dimple patterns of golf balls.

2. Description of the Related Art

Golf balls have a large number of dimples on the surface thereof. The dimples disturb the air flow around the golf ball during flight to cause turbulent flow separation. By causing the turbulent flow separation, separation points of the air from the golf ball shift backwards leading to a reduction of drag. The turbulent flow separation promotes the displacement between the separation point on the upper side and the separation point on the lower side of the golf ball, which results from the backspin, thereby enhancing the lift force that acts upon the golf ball. The reduction of drag and the enhancement of lift force are referred to as a "dimple effect".

The United States Golf Association (USGA) has established the rules about symmetry of golf balls. According to the rules, the trajectory during PH (pole horizontal) rotation and the trajectory during POP (pole over pole) rotation are compared with each other. A golf ball having a large difference between these two trajectories does not conform to the rules. In other words, a golf ball having inferior aerodynamic symmetry does not conform to the rules. A golf ball with inferior aerodynamic symmetry has a short flight distance because the aerodynamic characteristic of the golf ball for PH rotation or for POP rotation is inferior. The rotation axis for PH rotation extends through the poles of the golf ball, and the rotation axis for POP rotation is orthogonal to the rotation axis for PH rotation.

The dimples can be arranged by using a regular polyhedron that is inscribed in the phantom sphere of a golf ball. In this arrangement method, the surface of the phantom sphere is divided into a plurality of units by division lines obtained by projecting the sides of the polyhedron on the spherical surface. The dimple pattern of one unit is developed all over the phantom sphere. According to this dimple pattern, the aerodynamic characteristic in the case where a line passing through a vertex of the regular polyhedron is a rotation axis is different from that in the case where a line passing through the center of a surface of the regular polyhedron is a rotation axis. Such a golf ball has inferior aerodynamic symmetry.

JP50-8630 (U.S. Pat. No. 4,729,861, U.S. Pat. No. 4,936,587, and U.S. Pat. No. 5,080,367) discloses a golf ball having an improved dimple pattern. The surface of the golf ball is divided by an icosahedron that is inscribed in the phantom sphere thereof. On the basis of this division, dimples are arranged on the surface of the golf ball. According to this dimple pattern, the number of great circles that do not intersect any dimples is 1. This great circle coincides with the equator of the golf ball. The region near the equator is a unique region.

Generally, a golf ball is formed by a mold including upper and lower mold halves. The mold has a parting line. A golf ball obtained by this mold has a seam at a position along the parting line. Through this forming, spew occurs along the seam. The spew is removed by means of cutting. By cutting the spew, the dimples near the seam are deformed. In addition, the dimples near the seam tend to be orderly arranged. The seam is located along the equator of the golf ball. The region near the equator is a unique region.

A mold having an uneven parting line has been used. A golf ball obtained by this mold has dimples on the equator thereof. The dimples on the equator contribute to eliminating the uniqueness of the region near the equator. However, the uniqueness is not sufficiently eliminated. This golf ball has insufficient aerodynamic symmetry.

JP61-284264 (U.S. Pat. No. 4,744,564) discloses a golf ball in which the dimples near the seam are greater in volume than the dimples near the poles. This volume difference contributes to eliminating the uniqueness of the region near the equator. This golf ball eliminates, by the volume difference of dimples, the disadvantage caused by the dimple pattern. The disadvantage caused by the dimple pattern is eliminated not by modification of the dimple pattern. In the golf ball, the potential of the dimple pattern is sacrificed. The flight distance of the golf ball is insufficient.

JP9-164223 (U.S. Pat. No. 5,688,194 and U.S. Pat. No. 5,772,532) discloses a golf ball in which a large number of dimples are randomly arranged. The random arrangement enhances aerodynamic symmetry. JP2000-189542 (U.S. Pat. No. 6,254,496) also discloses a golf ball in which a large number of dimples are randomly arranged.

JP2010-213741 (US2010/0234141) discloses a golf ball having a rugged pattern obtained by a Cellular Automaton method. In the rugged pattern, dimples are randomly arranged.

In a method disclosed in JP9-164223, a process of trial and error is conducted in order to obtain a desired dimple pattern. In a method disclosed in JP2000-189542 as well, a process of trial and error is conducted in order to obtain a desired dimple pattern.

In the golf ball disclosed in JP2010-213741, the dimples are non-circular. The dimple effect of the dimples is insufficient.

An object of the present invention is to provide a golf ball having circular dimples and excellent aerodynamic symmetry.

SUMMARY OF THE INVENTION

A process for designing a dimple pattern of a golf ball according to the present invention comprises the steps of:

(1) randomly arranging a large number of points on a surface of a phantom sphere;

(2) calculating a distance between a first point and a second point which is a point closest to the first point;

(3) deciding a radius on the basis of the distance;

(4) assuming a circle which has a center at the first point and has the radius; and (5) assuming a dimple whose contour coincides with the circle.

The step (1) includes the steps of:

(1.1) generating random numbers;

(1.2) deciding a coordinate on the surface of the phantom sphere on the basis of the random numbers;

(1.3) calculating a distance between a point having the coordinate and a point that has already been present on the surface of the phantom sphere; and (1.4) recognizing the point having the coordinate as a point present on the surface of the phantom sphere when the distance is within a predetermined range.

By the designing process, a golf ball having excellent aerodynamic symmetry can easily be obtained.

Preferably, the step (1) further includes the steps of:

(1.5) regarding one point on the surface of the phantom sphere as a reference point;

(1.6) deciding a plurality of adjacent points which are adjacent to the reference point;

(1.7) calculating an average of coordinates of the plurality of adjacent points; and (1.8) replacing a coordinate of the reference point with a coordinate of the average.

Preferably, the step (1.6) includes the steps of:

(1.6.1) assuming a large number of triangles by a Delaunay triangulation using all points on the surface of the phantom sphere; and (1.6.2) regarding other vertices of a triangle whose vertex is the reference point, as the adjacent points.

Preferably, at the step (3), half of the distance is set as the radius.

A golf ball according to the present invention has a large number of dimples on a surface thereof. These dimples are randomly arranged. A pattern of these dimples is designed by the process described above.

Preferably, a fluctuation range Rh and a fluctuation range Ro of the golf ball are equal to or less than 3.3 mm and are obtained by the steps of:

(1) assuming a line which connects both poles of the golf ball, as a first rotation axis;

(2) assuming a great circle which exists on a surface of a phantom sphere of the golf ball and is orthogonal to the first rotation axis;

(3) assuming two small circles which exist on the surface of the phantom sphere of the golf ball, which are orthogonal to the first rotation axis, and of which an absolute value of a central angle with the great circle is 30°;

(4) defining a region, of the surface of the golf ball, which is obtained by dividing the golf ball at the two small circles and which is sandwiched between the two small circles;

(5) determining 30240 points on the region at intervals of a central angle of 3° in a direction of the first rotation axis and at intervals of a central angle of 0.25° in a direction of rotation about the first rotation axis;

(6) calculating a length L1 of a perpendicular line which extends from each point to the first rotation axis;

(7) calculating a total length L2 by summing twenty-one lengths L1 calculated on the basis of twenty-one perpendicular lines arranged in the direction of the first rotation axis;

(8) determining a maximum value and a minimum value among 1440 total lengths L2 calculated along the direction of rotation about the first rotation axis, and calculating a fluctuation range Rh by subtracting the minimum value from the maximum value;

(9) assuming a second rotation axis orthogonal to the first rotation axis assumed at the step (1);

(10) assuming a great circle which exists on the surface of the phantom sphere of the golf ball and is orthogonal to the second rotation axis;

(11) assuming two small circles which exist on the surface of the phantom sphere of the golf ball, which are orthogonal to the second rotation axis, and of which an absolute value of a central angle with the great circle is 30°;

(12) defining a region, of the surface of the golf ball, which is obtained by dividing the golf ball at the two small circles and which is sandwiched between the two small circles;

(13) determining 30240 points on the region at intervals of a central angle of 3° in a direction of the second rotation axis and at intervals of a central angle of 0.25° in a direction of rotation about the second rotation axis;

(14) calculating a length L1 of a perpendicular line which extends from each point to the second rotation axis;

(15) calculating a total length L2 by summing twenty-one lengths L1 calculated on the basis of twenty-one perpendicular lines arranged in the direction of the second rotation axis; and

(16) determining a maximum value and a minimum value among 1440 total lengths L2 calculated along the direction of rotation about the second rotation axis, and calculating a fluctuation range Ro by subtracting the minimum value from the maximum value.

Preferably, an absolute value of a difference dR between the fluctuation range Rh and the fluctuation range Ro is equal to or less than 1.0 mm.

DESCRIPTION OF THE PREFERRED EMBODIMENTS

The following will describe in detail the present invention, based on preferred embodiments with reference to the accompanying drawings.

Figure 1:
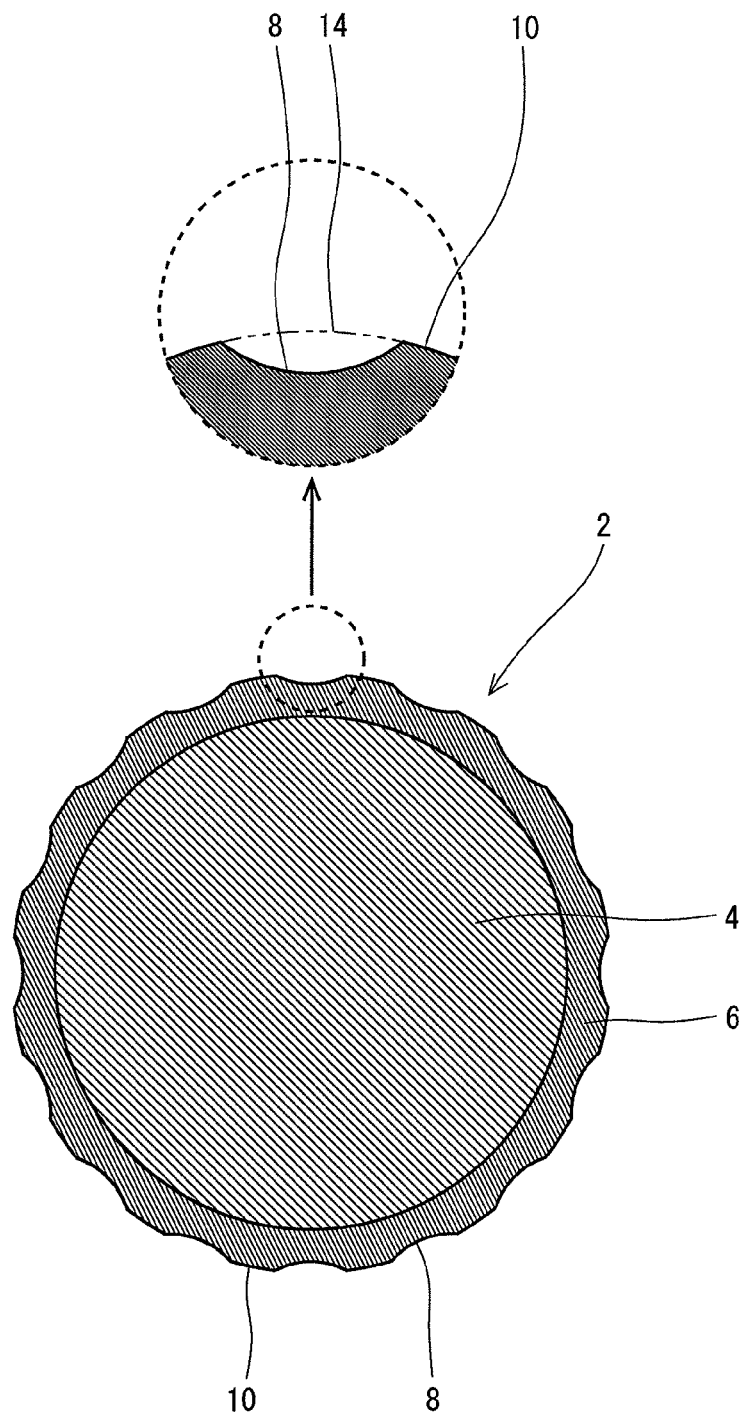
FIG. 1 is a schematic cross-sectional view of a golf ball according to one embodiment of the present invention.

A golf ball 2 shown in FIG. 1 includes a spherical core 4 and a cover 6. On the surface of the cover 6, a large number of dimples 8 are formed. Of the surface of the golf ball 2, a part other than the dimples 8 is a land 10. The golf ball 2 includes a paint layer and a mark layer on the external side of the cover 6 although these layers are not shown in the drawing. A mid layer may be provided between the core 4 and the cover 6.

The golf ball 2 preferably has a diameter of 40 mm or greater but 45 mm or less. From the standpoint of conformity to the rules established by the United States Golf Association (USGA), the diameter is particularly preferably equal to or greater than 42.67 mm. In light of suppression of air resistance, the diameter is more preferably equal to or less than 44 mm and particularly preferably equal to or less than 42.80 mm. The golf ball 2 preferably has a weight of 40 g or greater but 50 g or less. In light of attainment of great inertia, the weight is more preferably equal to or greater than 44 g and particularly preferably equal to or greater than 45.00 g. From the standpoint of conformity to the rules established by the USGA, the weight is particularly preferably equal to or less than 45.93 g.

The core 4 is formed by crosslinking a rubber composition. Examples of base rubbers for use in the rubber composition include polybutadienes, polyisoprenes, styrene-butadiene copolymers, ethylene-propylene-diene copolymers, and natural rubbers. Two or more rubbers may be used in combination. In light of resilience performance, polybutadienes are preferred, and, high-cis polybutadienes are particularly preferred.

In order to crosslink the core 4, a co-crosslinking agent can be used. Examples of preferable co-crosslinking agents in light of resilience performance include zinc acrylate, magnesium acrylate, zinc methacrylate, and magnesium methacrylate. Preferably, the rubber composition includes an organic peroxide together with a co-crosslinking agent. Examples of suitable organic peroxides include dicumyl peroxide, 1,1-bis(t-butylperoxy)-3,3,5-trimethylcyclohexane, 2,5-dimethyl-2,5-di(t-butylperoxy)hexane, and di-t-butyl peroxide.

According to need, various additives such as sulfur, a sulfur compound, a filler, an anti-aging agent, a coloring agent, a plasticizer, a dispersant, and the like are included in the rubber composition of the core 4 in an adequate amount. Crosslinked rubber powder or synthetic resin powder may also be included in the rubber composition.

The core 4 has a diameter of 30.0 mm or greater and particularly 38.0 mm or greater. The diameter of the core 4 is equal to or less than 42.0 mm and particularly equal to or less than 41.5 mm. The core 4 may be composed of two or more layers. The core 4 may have a rib on its surface.

The cover 6 is formed from a resin composition. A preferable base resin of the resin composition is an ionomer resin. Examples of preferable ionomer resins include binary copolymers formed with an α-olefin and an α,β-unsaturated carboxylic acid having 3 to 8 carbon atoms. Examples of other preferable ionomer resins include ternary copolymers formed with: an α-olefin; an α,β-unsaturated carboxylic acid having 3 to 8 carbon atoms; and an α,β-unsaturated carboxylate ester having 2 to 22 carbon atoms. For the binary copolymers and ternary copolymers, preferable α-olefins are ethylene and propylene, while preferable α,β-unsaturated carboxylic acids are acrylic acid and methacrylic acid. In the binary copolymers and ternary copolymers, some of the carboxyl groups are neutralized with metal ions. Examples of metal ions for use in neutralization include sodium ion, potassium ion, lithium ion, zinc ion, calcium ion, magnesium ion, aluminum ion, and neodymium ion.

Another resin may be used instead of or together with an ionomer resin. Examples of the other resin include thermoplastic polyurethane elastomers, thermoplastic styrene elastomers, thermoplastic polyamide elastomers, thermoplastic polyester elastomers, and thermoplastic polyolefin elastomers. In light of spin performance, thermoplastic polyurethane elastomers are preferred.

According to need, a coloring agent such as titanium dioxide, a filler such as barium sulfate, a dispersant, an antioxidant, an ultraviolet absorber, a light stabilizer, a fluorescent material, a fluorescent brightener, and the like are included in the cover 6 in an adequate amount. For the purpose of adjusting specific gravity, powder of a metal with a high specific gravity such as tungsten, molybdenum, and the like may be included in the cover 6.

The cover 6 has a thickness of 0.1 mm or greater and particularly 0.3 mm or greater. The thickness of the cover 6 is equal to or less than 2.5 mm and particularly equal to or less than 2.2 mm. The cover 6 has a specific gravity of 0.90 or greater and particularly 0.95 or greater. The specific gravity of the cover 6 is equal to or less than 1.10 and particularly equal to or less than 1.05. The cover 6 may be composed of two or more layers.

Figure 2:
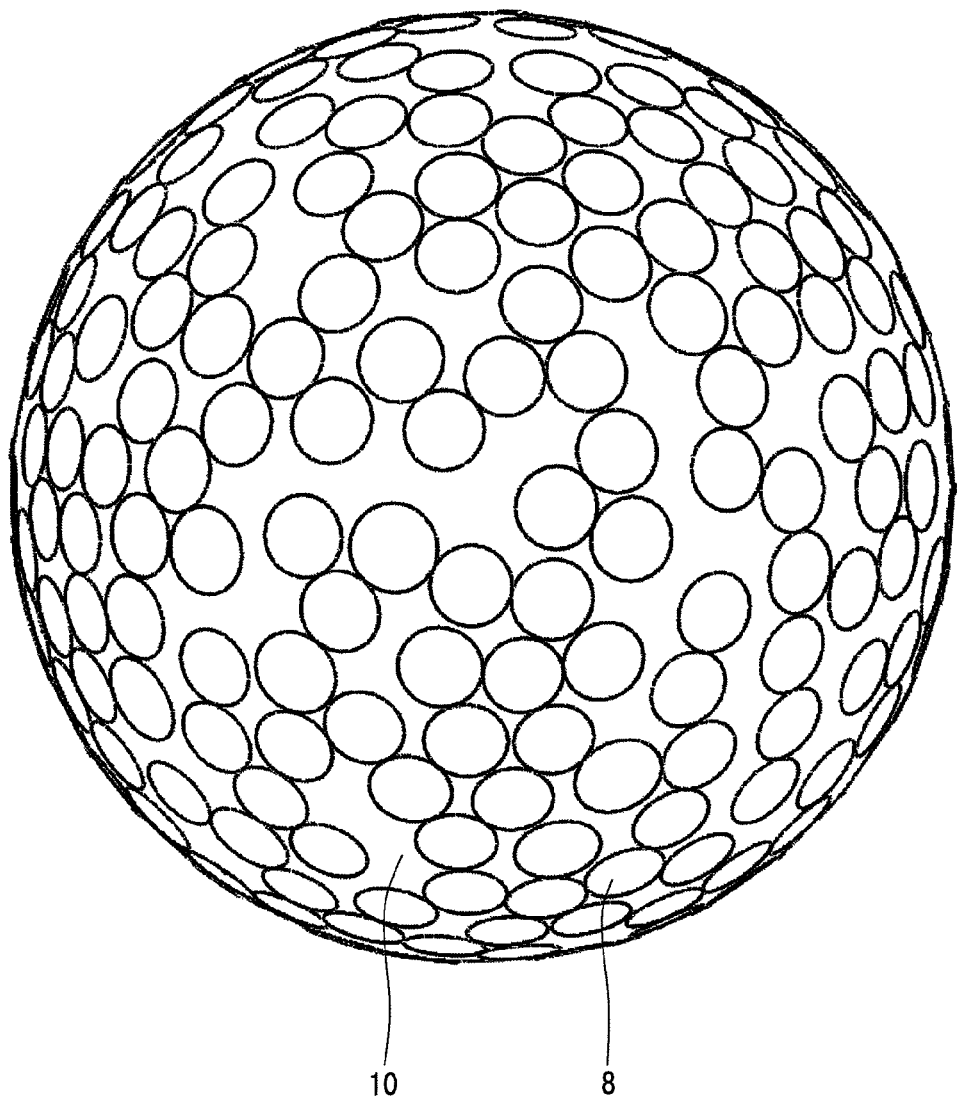
FIG. 2 is an enlarged front view of the golf ball in FIG. 1.
Figure 3:
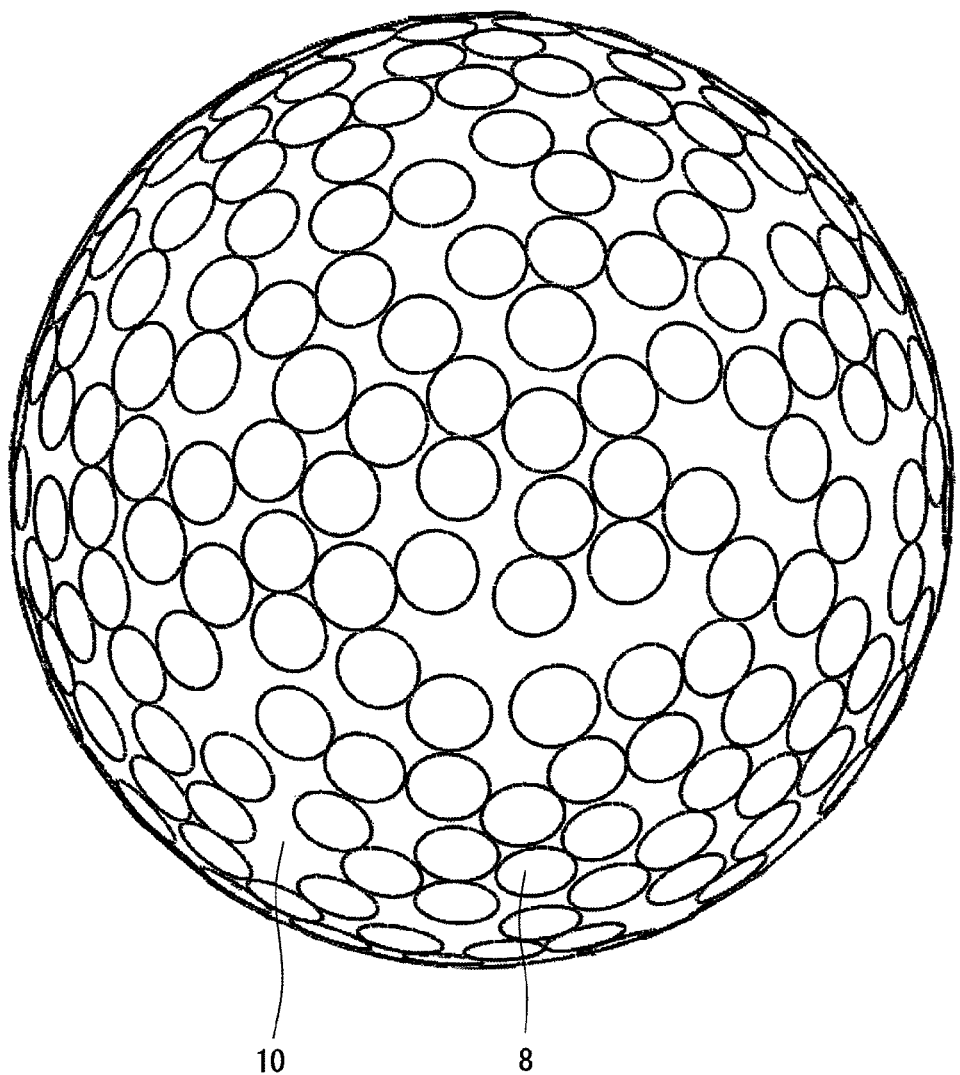
FIG. 3 is a plan view of the golf ball in FIG. 2.

FIG. 2 is an enlarged front view of the golf ball 2. FIG. 3 is a plan view of the golf ball 2 in FIG. 2. As is obvious from FIGS. 2 and 3, the golf ball 2 has a large number of the dimples 8. The contour of each dimple 8 is circular. By these dimples 8 and the land 10, a dimple pattern is formed on the surface of the golf ball 2.

In the dimple pattern, a large number of the dimples 8 are randomly arranged. In a process for designing the dimple pattern, a large number of points are arranged on the surface of a phantom sphere of the golf ball 2. Circles having centers at the points, respectively, are assumed. Dimples 8 whose contours coincide with the circles, respectively, are assumed. Since the arrangement of the points is random, the arrangement of the dimples 8 is also random. The designing process is preferably executed using a computer and software in light of efficiency. Of course, the present invention is practicable even by hand calculation. The essence of the present invention is not in a computer and software.

Random numbers are used for arranging the points. Each point on the surface of the phantom sphere is represented by a spherical coordinate $(\theta, \phi)$. Here, $\theta$ indicates a latitude, and $\phi$ indicates a longitude. According to the paper of Robin Green, "Spherical Harmonic Lighting: The Gritty Details", the spherical coordinate $(\theta, \phi)$ can be calculated by the following mathematical formula.

$$(\theta, \phi) = (2 \cos^{-1}(1-\xi_x)^{1/2}, 2\pi\xi_y)$$

In the mathematical formula, $\xi_x$ and $\xi_y$ are random numbers that are real numbers of 0 or greater but 1 or less.

Random numbers $\xi_x$ and $\xi_y$ are sequentially generated, a spherical coordinate $(\theta, \phi)$ is calculated, and a point having the spherical coordinate $(\theta, \phi)$ is arranged on the surface of the phantom sphere. At that time, if the arrangement is performed unlimitedly, a zone in which points are concentrated can occur. In other words, a zone in which dimples 8 are concentrated can occur. For the purpose of avoiding occurrence of such a zone, a restriction is placed on arranging the points. Specifically, the distance between the point having the spherical coordinate $(\theta, \phi)$ and a point that has already been present on the surface of the phantom sphere and is closest to the point having the spherical coordinate $(\theta, \phi)$ is calculated. When the distance is within a predetermined range, the point having the spherical coordinate $(\theta, \phi)$ is recognized as a point present on the surface of the phantom sphere. When the distance between the point having the spherical coordinate (θ, φ) and the point that has already been present on the surface of the phantom sphere is out of the predetermined range, the point having the spherical coordinate (θ, φ) is not recognized as a point present on the surface of the phantom sphere. It should be noted that the distance may be the length of a straight line connecting these points or the length of a circular arc that connects these points and is present on the surface of the phantom sphere.

When the above distance is the length of the straight line, the range of the distance in which the point having the spherical coordinate (θ, φ) is recognized as a point present on the surface of the phantom sphere is preferably equal to or greater than 2.5 mm and particularly preferably equal to or greater than 3.0 mm. This range is preferably equal to or less than 6.0 mm and particularly preferably equal to or less than 5.5 mm.

Until the number of points on the surface of the phantom sphere reaches a predetermined number, the following is repeated:
 (a) generation of random numbers $\xi_x$ and $\xi_y$;
 (b) calculation of a distance; and
 (c) determination as to whether or not the distance is within a predetermined range.

Figure 4:
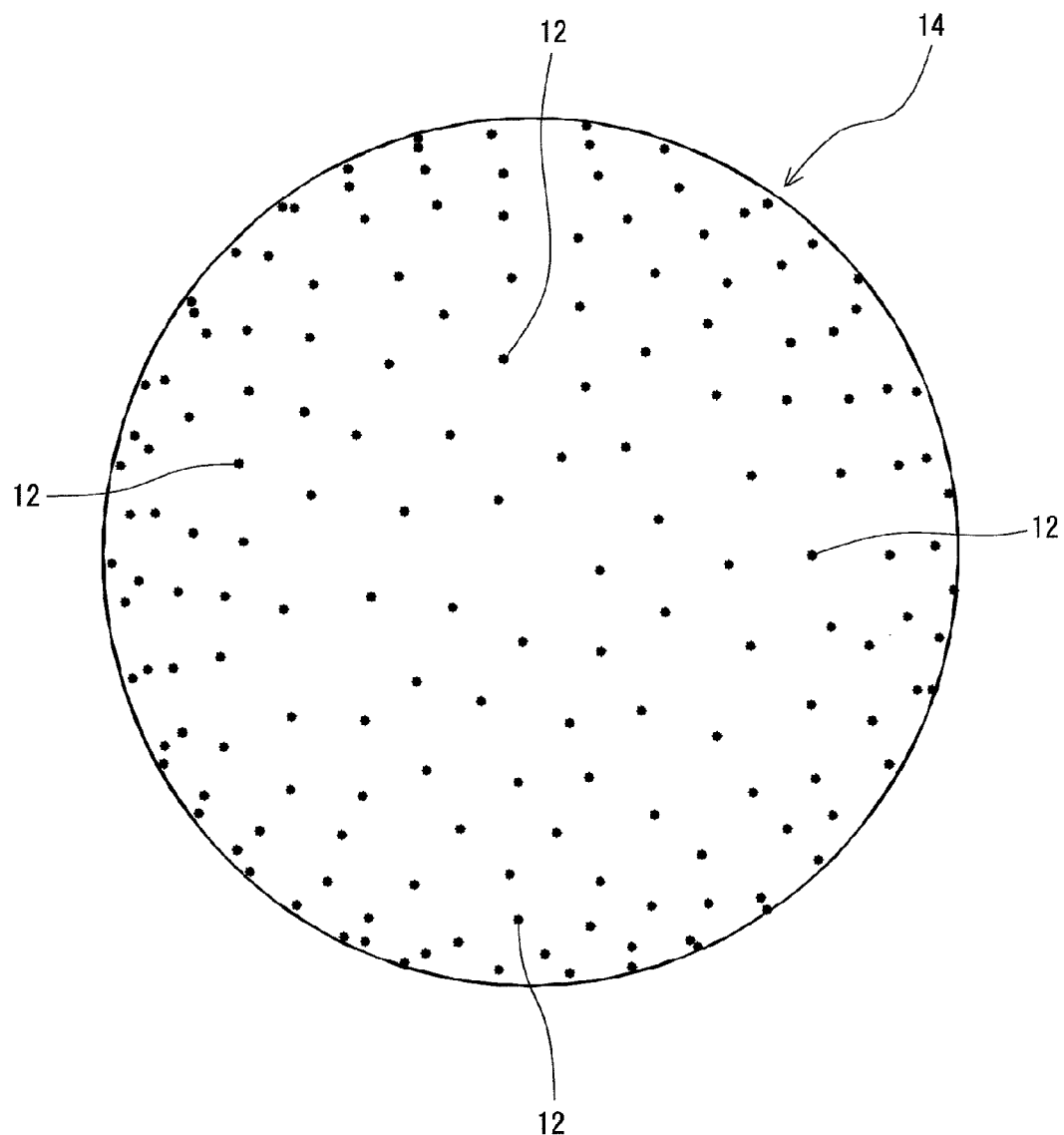
FIG. 4 is a front view of a phantom sphere in which a large number of points are randomly arranged.
Figure 5:
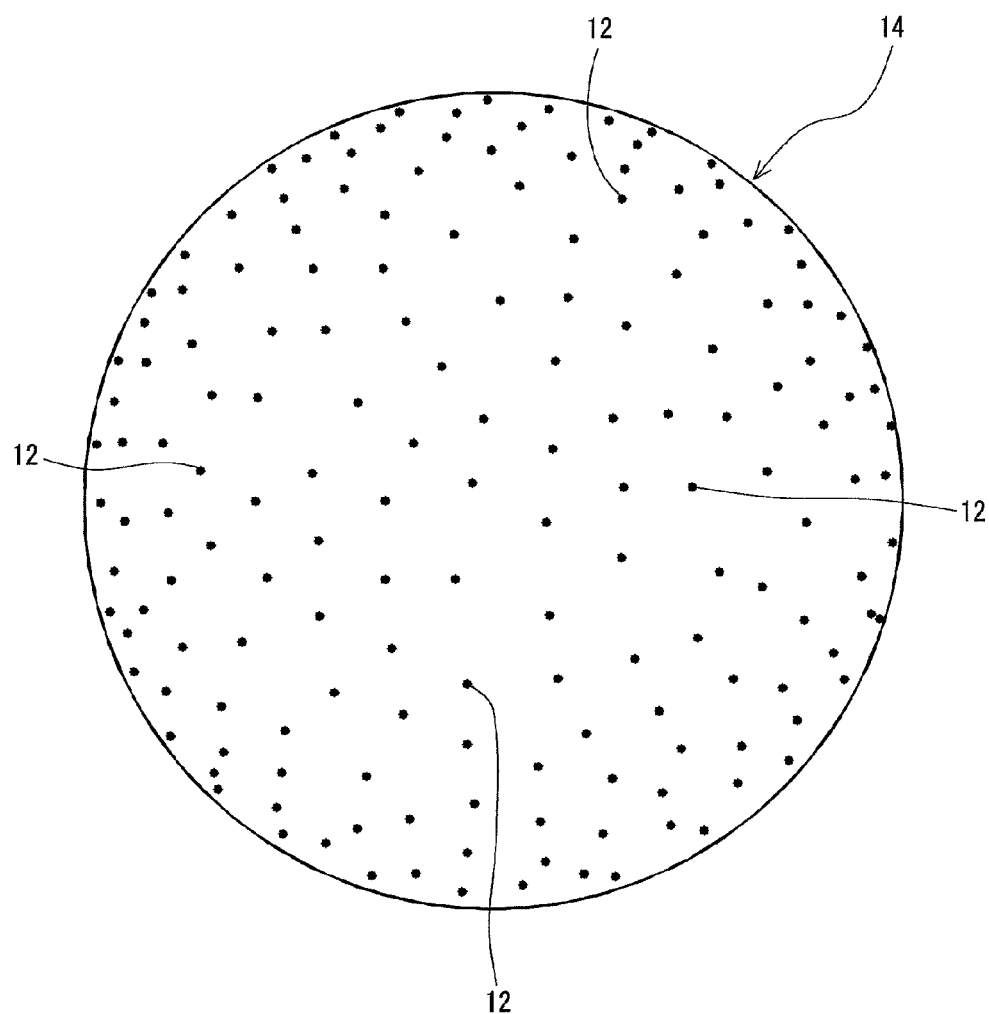
FIG. 5 is a plan view of the phantom sphere in FIG. 4.

FIGS. 4 and 5 show a phantom sphere 14 in which a large number of points 12 are randomly arranged by the aforementioned method. In this embodiment, the number of the points 12 is 324. In this embodiment, when the distance between a point 12 having the spherical coordinate (θ, φ) and a point 12 that has already been present on the surface of the phantom sphere 14 and is closest to the point 12 having the spherical coordinate (θ, φ) is equal to or greater than 3.7 mm but equal to or less than 4.0 mm, the point 12 having the spherical coordinate (θ, φ) is recognized as a point present on the surface of the phantom sphere 14.

Figure 6:
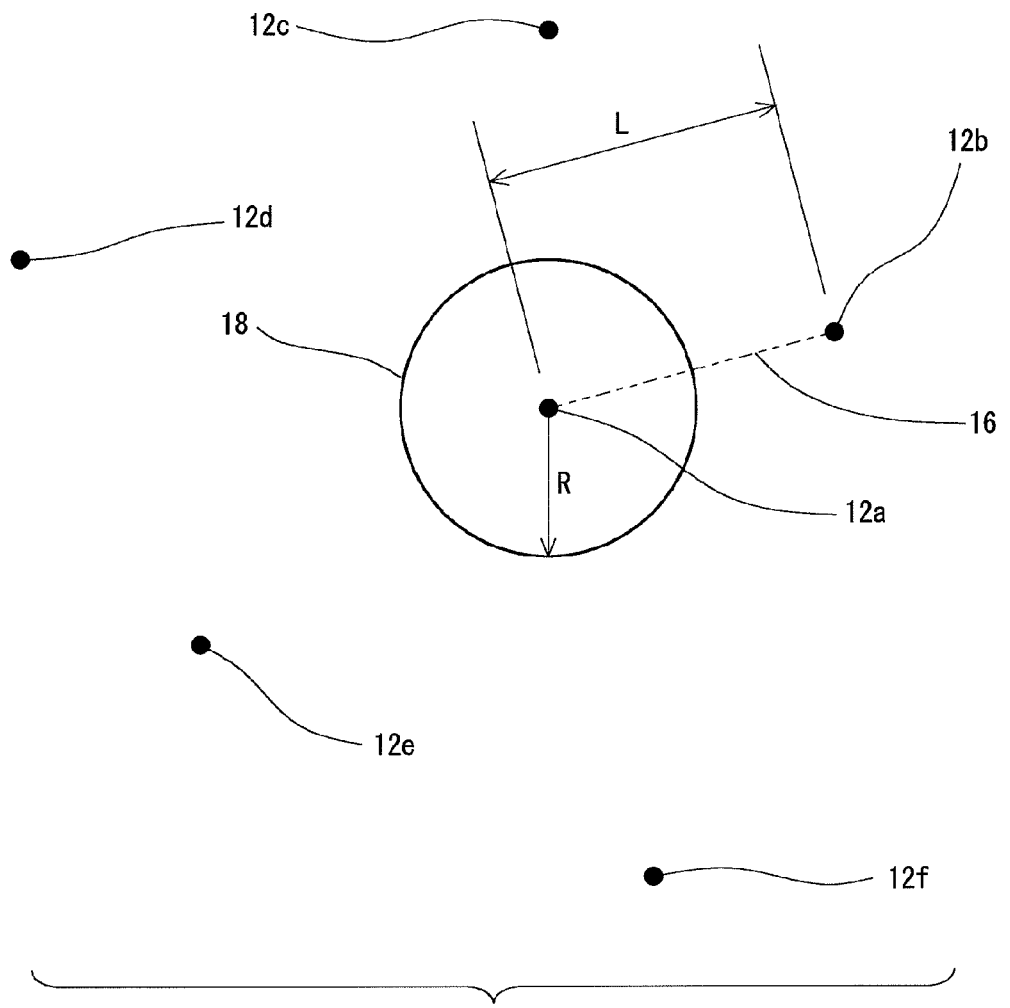
FIG. 6 is a partially enlarged view of the phantom sphere in FIG. 4.

FIG. 6 shows a first point 12a and five points (12b to 12f) adjacent to the first point 12a. Among these points 12b to 12f, the point 12b is closest to the first point 12a. Hereinafter, the point 12b is referred to as second point. In FIG. 6, what is indicated by a reference sign 16 is an imaginary line connecting the first point 12a to the second point 12b, and what is indicated by an arrow L is the length of the imaginary line 16. The length L is the distance between the first point 12a and the second point 12b. The first point 12a and the second point 12b are located on a spherical surface. Thus, the distance L can be calculated as a circular arc length. The distance L may be calculated as a chord length.

In FIG. 6, what is indicated by a reference sign 18 is a circle having a center at the first point 12a. The circle 18 has a radius R. The radius R is decided on the basis of the distance L. In the embodiment, the radius R is half of the distance L. A dimple 8 whose contour coincides with the circle 18 is assumed. In other words, the inside of the circle 18 is recessed from the surface of the phantom sphere 14. The cross-sectional shape of the dimple 8 is arbitrary. A dimple 8 whose cross-sectional shape has a single radius may be assumed, or a dimple 8 whose cross-sectional shape has a double radius may be assumed. A dimple 8 having another cross-sectional shape may be assumed.

For each point 12, a circle 18 obtained when this point 12 is set as the first point 12a is assumed. Furthermore, for each circle 18, a dimple 8 whose contour coincides with this circle 18 is assumed. In this manner, the dimple pattern shown in FIGS. 2 and 3 is obtained. Since the points 12 are randomly arranged, the dimples 8 are also randomly arranged. The diameters of the dimples 8 are also ununiform.

Since the radius R is half of the distance L as described above, the adjacent dimples 8 do not overlap each other. The adjacent dimples 8 are in contact with or spaced apart from each other.

For the purpose of causing the adjacent dimples 8 to overlap each other, the radius R may be larger than half of the distance L. For the purpose of increasing the area of the land 10, the radius R may be smaller than half of the distance L. In any of these cases, the radius R is decided in connection with the distance L.

In light of suppression of rising of the golf ball 2 during flight, each dimple 8 has a depth of preferably 0.05 mm or greater, more preferably 0.08 mm or greater, and particularly preferably 0.10 mm or greater. In light of suppression of dropping of the golf ball 2 during flight, the depth is preferably equal to or less than 0.60 mm, more preferably equal to or less than 0.45 mm, and particularly preferably equal to or less than 0.40 mm. The depth is the distance between the deepest point of the dimple 8 and the surface of the phantom sphere 14.

In the present invention, the "volume of the dimple 8" means the volume of the portion surrounded by the surface of the dimple 8 and the plane including the contour of the dimple 8. In light of suppression of rising of the golf ball 2 during flight, the sum of the volumes (total volume) of all the dimples 8 is preferably equal to or greater than 260 mm$^3$ and particularly preferably equal to or greater than 280 mm$^3$. In light of suppression of dropping of the golf ball 2 during flight, the sum is preferably equal to or less than 380 mm$^3$, more preferably equal to or less than 350 mm$^3$, and particularly preferably equal to or less than 330 mm$^3$.

In light of flight performance, the ratio (occupation ratio) of the sum of the areas of the dimples 8 to the surface area of the phantom sphere 14 is preferably equal to or greater than 60% and particularly preferably equal to or greater than 70%.

From the standpoint that a fundamental feature of the golf ball 2 being substantially a sphere is not impaired, the total number of the dimples 8 is preferably equal to or greater than 250 and particularly preferably equal to or greater than 310. From the standpoint that each dimple 8 exerts a sufficient dimple effect, the total number is preferably equal to or less than 400 and particularly preferably equal to or less than 330.

Preferably, the golf ball 2 has a difference dR whose absolute value is equal to or less than 1.0 mm. The absolute value is a parameter that correlates with the aerodynamic symmetry of the golf ball 2. The smaller the absolute value is, the smaller the difference between the trajectory during PH rotation and the trajectory during POP rotation is. The absolute value of the difference dR is more preferably equal to or less than 0.10 and particularly preferably equal to or less than 0.05. The following will describe an evaluation method based on the difference dR.

Figure 7:
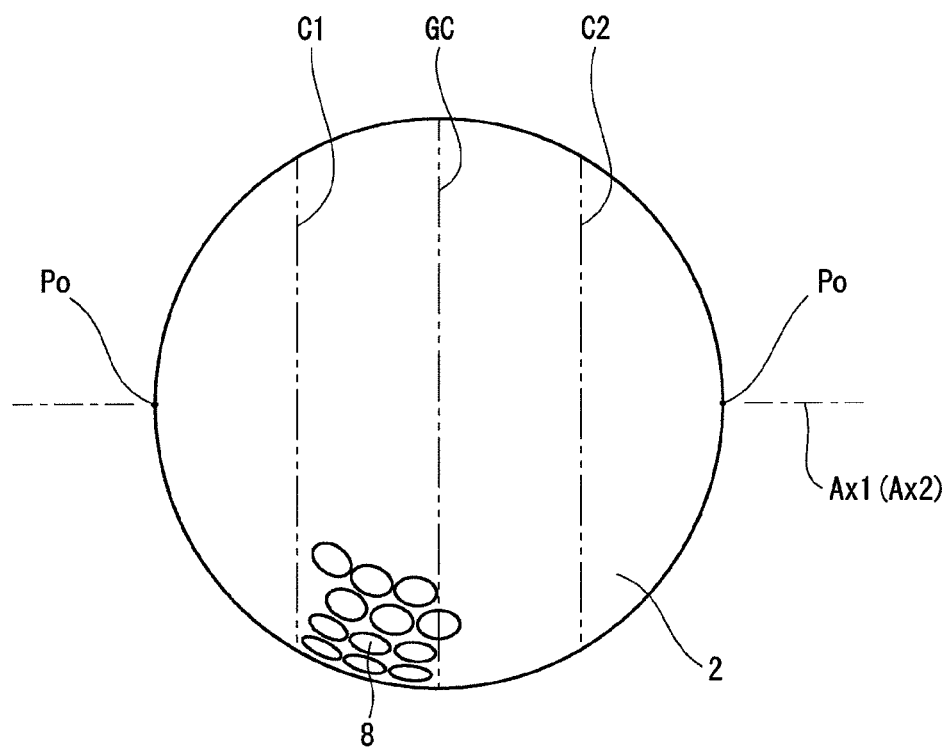
FIG. 7 is a schematic diagram for explaining a method for evaluating the golf ball in FIG. 2.

FIG. 7 is a schematic diagram for explaining the evaluation method. In the evaluation method, a first rotation axis Ax1 is assumed. The first rotation axis Ax1 passes through the two poles Po of the golf ball 2. Each pole Po corresponds to the deepest point of the mold used for forming the golf ball 2. One of the poles Po corresponds to the deepest point of an upper mold half, and the other pole Po corresponds to the deepest point of a lower mold half. The golf ball 2 rotates about the first rotation axis Ax1. This rotation is referred to as PH rotation.

Figure 8:
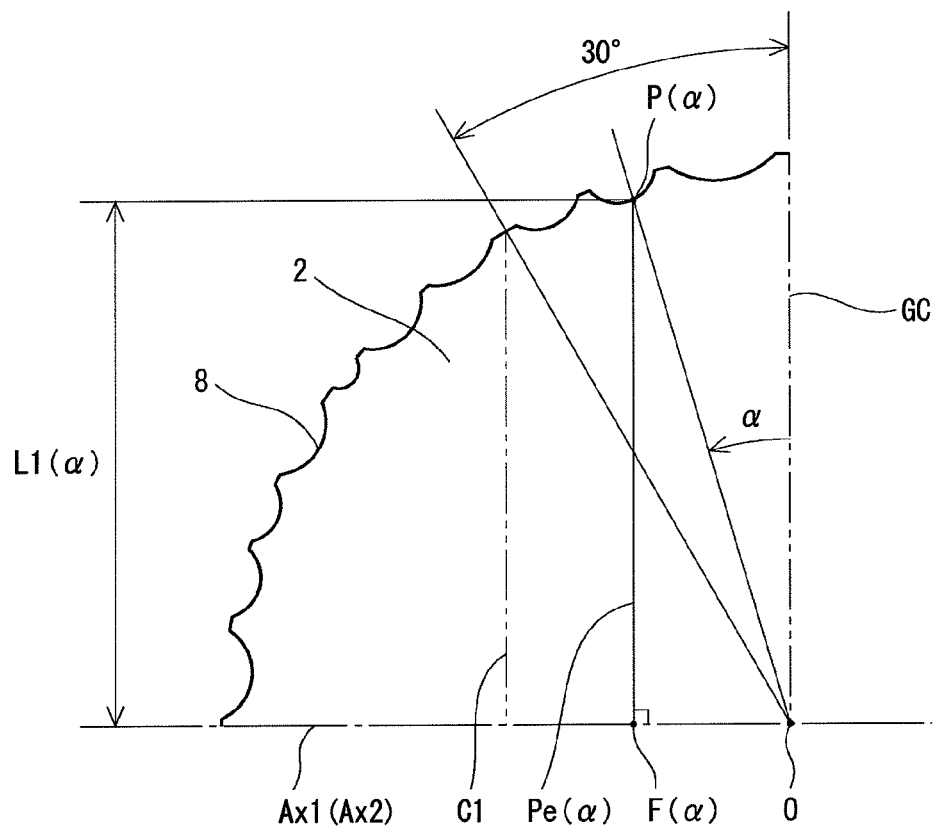
FIG. 8 is a schematic diagram for explaining the method for evaluating the golf ball in FIG. 2.

There is assumed a great circle GC that exists on the surface of the phantom sphere 14 of the golf ball 2 and is orthogonal to the first rotation axis Ax1. The circumferential speed of the great circle GC is faster than any other part of the golf ball 2 during rotation of the golf ball 2. In addition, there are assumed two small circles C1 and C2 that exist on the surface of the phantom sphere 14 of the golf ball 2 and are orthogonal to the first rotation axis Ax1. FIG. 8 schematically shows a partial cross section of the golf ball 2 in FIG. 7. In FIG. 8, the right-to-left direction is the direction of the first rotation axis Ax1. As shown in FIG. 8, the absolute value of the central angle between the small circle C1 and the great circle GC is 30°. Although not shown in the drawing, the absolute value of the central angle between the small circle C2 and the great circle GC is also 30°. The phantom sphere 14 is divided at the small circles C1 and C2, and of the surface of the golf ball 2, a region sandwiched between the small circles C1 and C2 is defined.

In FIG. 8, a point $P(\alpha)$ is the point which is located on the surface of the golf ball 2 and of which the central angle with the great circle GC is $\alpha°$ (degree). A point $F(\alpha)$ is a foot of a perpendicular line $Pe(\alpha)$ which extends downward from the point $P(\alpha)$ to the first rotation axis Ax1. What is indicated by an arrow $L1(\alpha)$ is the length of the perpendicular line $Pe(\alpha)$. In other words, the length $L1(\alpha)$ is the distance between the point $P(\alpha)$ and the first rotation axis Ax1. For one cross section, the lengths $L1(\alpha)$ are calculated at twenty-one points $P(\alpha)$. Specifically, the lengths $L1(\alpha)$ are calculated at angles $\alpha$ of $-30°$, $-27°$, $-24°$, $-21°$, $-18°$, $-15°$, $-12°$, $-9°$, $-6°$, $-3°$, $0°$, $3°$, $6°$, $9°$, $12°$, $15°$, $18°$, $21°$, $24°$, $27°$, and $30°$. The twenty-one lengths $L1(\alpha)$ are summed to obtain a total length L2 (mm). The total length L2 is a parameter dependent on the surface shape in the cross section shown in FIG. 8.

Figure 9:
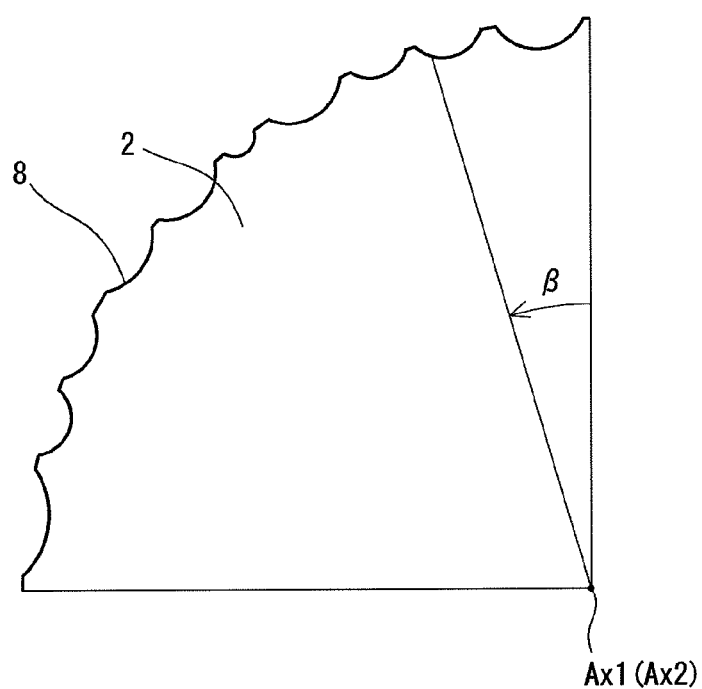
FIG. 9 is a schematic diagram for explaining the method for evaluating the golf ball in FIG. 2.
Figure 10:
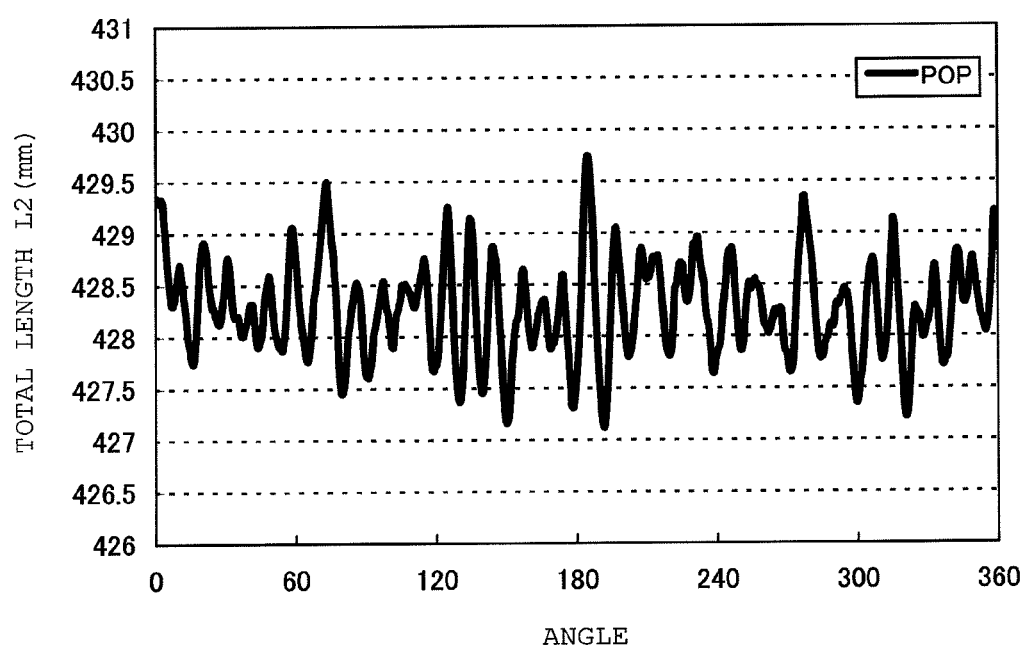
FIG. 10 is a graph showing an evaluation result of the golf ball in FIGS. 2 and 3.

FIG. 9 shows a partial cross section of the golf ball 2. In FIG. 9, the direction perpendicular to the surface of the sheet is the direction of the first rotation axis Ax1. In FIG. 9, what is indicated by a reference sign $\beta$ is a rotation angle of the golf ball 2. In a range equal to or greater than 0° and smaller than 360°, the rotation angles $\beta$ are set at an interval of an angle of 0.25°. At each rotation angle, the total length L2 is calculated. As a result, 1440 total lengths L2 are obtained along the rotation direction. In other words, a data constellation regarding a parameter dependent on a surface shape appearing at a predetermined point moment by moment during one rotation of the golf ball 2, is calculated. The data constellation is calculated on the basis of the 30240 lengths L1. FIG. 10 shows a graph in which a data constellation of the golf ball 2 shown in FIGS. 2 and 3 is plotted. In the graph, the horizontal axis indicates the rotation angle $\beta$, and the vertical axis indicates the total length L2. From the graph, the maximum and minimum values of the total lengths L2 are determined. The minimum value is subtracted from the maximum value to calculate a fluctuation range Rh. The fluctuation range Rh is a numeric value indicating an aerodynamic characteristic during PH rotation.

Figure 11:
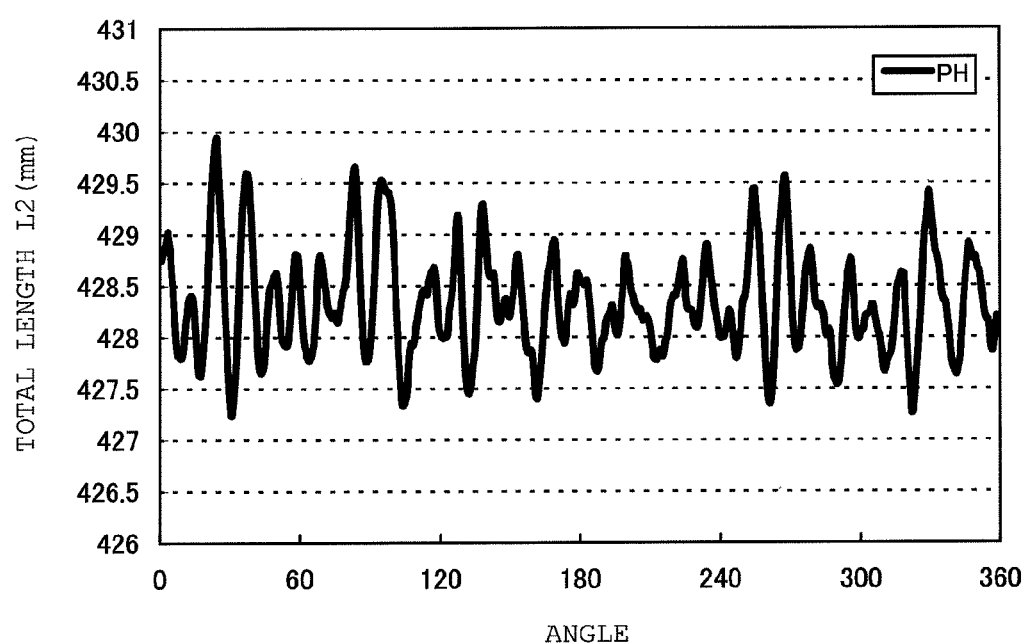
FIG. 11 is a graph showing another evaluation result of the golf ball in FIGS. 2 and 3.

Furthermore, a second rotation axis Ax2 orthogonal to the first rotation axis Ax1 is decided. Rotation of the golf ball 2 about the second rotation axis Ax2 is referred to as POP rotation. Similarly as for PH rotation, for POP rotation, a great circle GC and two small circles C1 and C2 are assumed. The absolute value of the central angle between the small circle C1 and the great circle GC is 30°. The absolute value of the central angle between the small circle C2 and the great circle GC is also 30°. For a region, sandwiched between the small circles C1 and C2, of the surface of the golf ball 2, 1440 total lengths L2 are calculated. In other words, a data constellation regarding a parameter dependent on a surface shape appearing at a predetermined point moment by moment during one rotation of the golf ball 2, is calculated. FIG. 11 shows a graph in which a data constellation of the golf ball 2 shown in FIGS. 2 and 3 is plotted. In the graph, the horizontal axis indicates the rotation angle $\beta$, and the vertical axis indicates the total length L2. From the graph, the maximum and minimum values of the total lengths L2 are determined. The minimum value is subtracted from the maximum value to calculate a fluctuation range Ro. The fluctuation range Ro is a numeric value indicating an aerodynamic characteristic during POP rotation.

There are numerous straight lines orthogonal to the first rotation axis Ax1. Thus, there are also numerous great circles GC. A great circle GC, whose part included in the dimples 8 is the longest, is selected, and a fluctuation range Ro and a difference dR are calculated. Instead of this, twenty great circles GC may be extracted in a random manner, and twenty fluctuation ranges may be calculated on the basis of the extracted twenty great circles GC. In this case, the maximum value among twenty pieces of data is set as Ro.

The smaller the fluctuation range Rh is, the larger the flight distance at PH rotation is. The reason is inferred to be that the smaller the fluctuation range Rh is, the more smoothly transition of a turbulent flow continues. In this respect, the fluctuation range Rh is preferably equal to or less than 3.0 mm. The smaller the fluctuation range Ro is, the larger the flight distance at POP rotation is. The reason is inferred to be that the smaller the fluctuation range Ro is, the more smoothly transition of a turbulent flow continues. In this respect, the fluctuation range Ro is preferably equal to or less than 3.0 mm. In light of attainment of a large flight distance at any of PH rotation and POP rotation, both the fluctuation range Rh and the fluctuation range Ro are preferably equal to or less than 3.0 mm.

The fluctuation range Ro is subtracted from the fluctuation range Rh to calculate the difference dR. The difference dR is a parameter indicating the aerodynamic symmetry of the golf ball 2. According to the finding by the inventor of the present invention, the golf ball 2 in which the absolute value of the difference dR is small has excellent aerodynamic symmetry. It is inferred that this is because the similarity between the surface shape during PH rotation and the surface shape during POP rotation is high.

Figure 12:
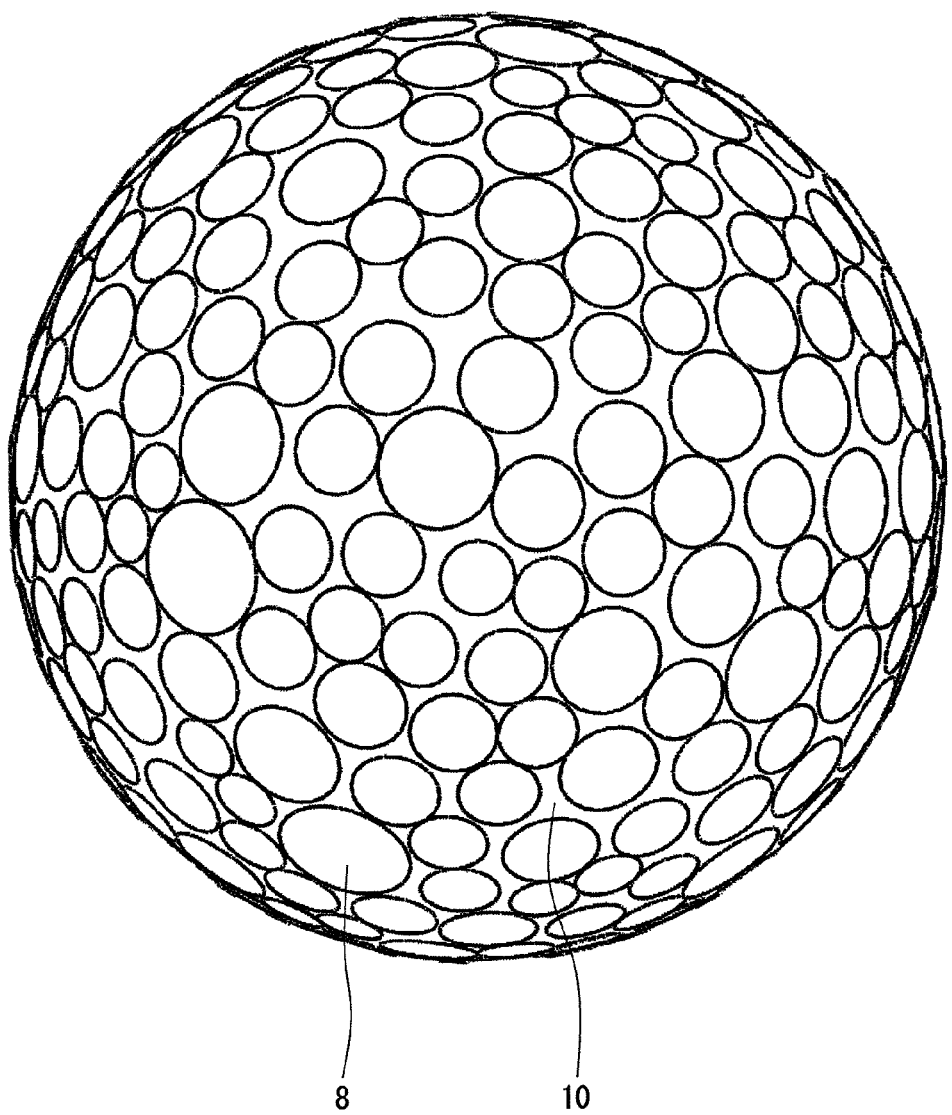
FIG. 12 is a front view of a golf ball according to another embodiment of the present invention.
Figure 13:
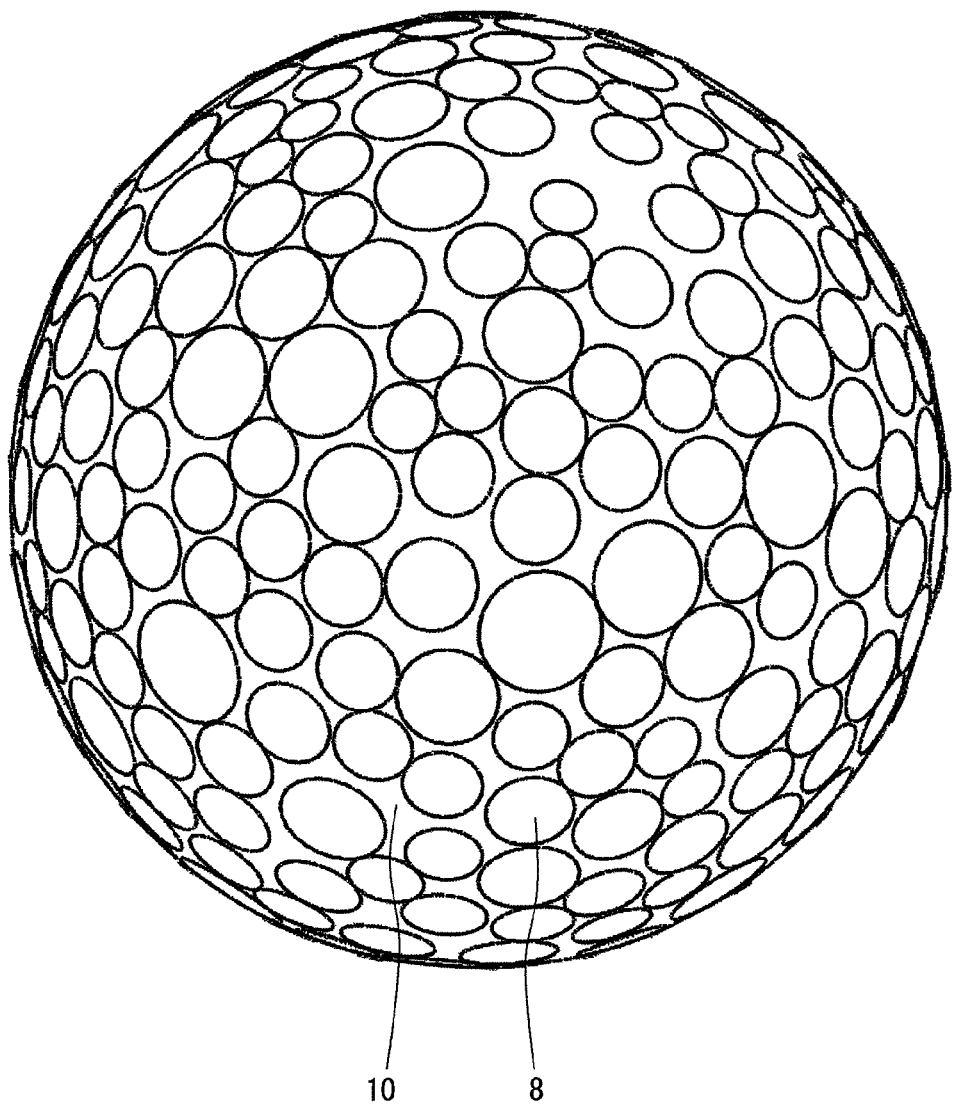
FIG. 13 is a plan view of the golf ball in FIG. 12.

FIG. 12 is a front view of a golf ball 22 according to another embodiment of the present invention. FIG. 13 is a plan view of the golf ball 22 in FIG. 12. The golf ball 22 also has a large number of dimples 8 on its surface. By the dimples 8 and a land 10, a dimple pattern is formed on the surface of the golf ball 22.

In a process for designing this dimple pattern as well, a large number of the points 12 shown in FIGS. 4 and 5 are assumed on the surface of a phantom sphere 14. In this embodiment, corrections are made on the coordinates of these points 12. The corrections can be achieved by the Delaunay triangulation. In this method, the surface of the phantom sphere 14 is divided into a large number of triangles (Delaunay regions). The following will describe a method of this division.

Figure 14:
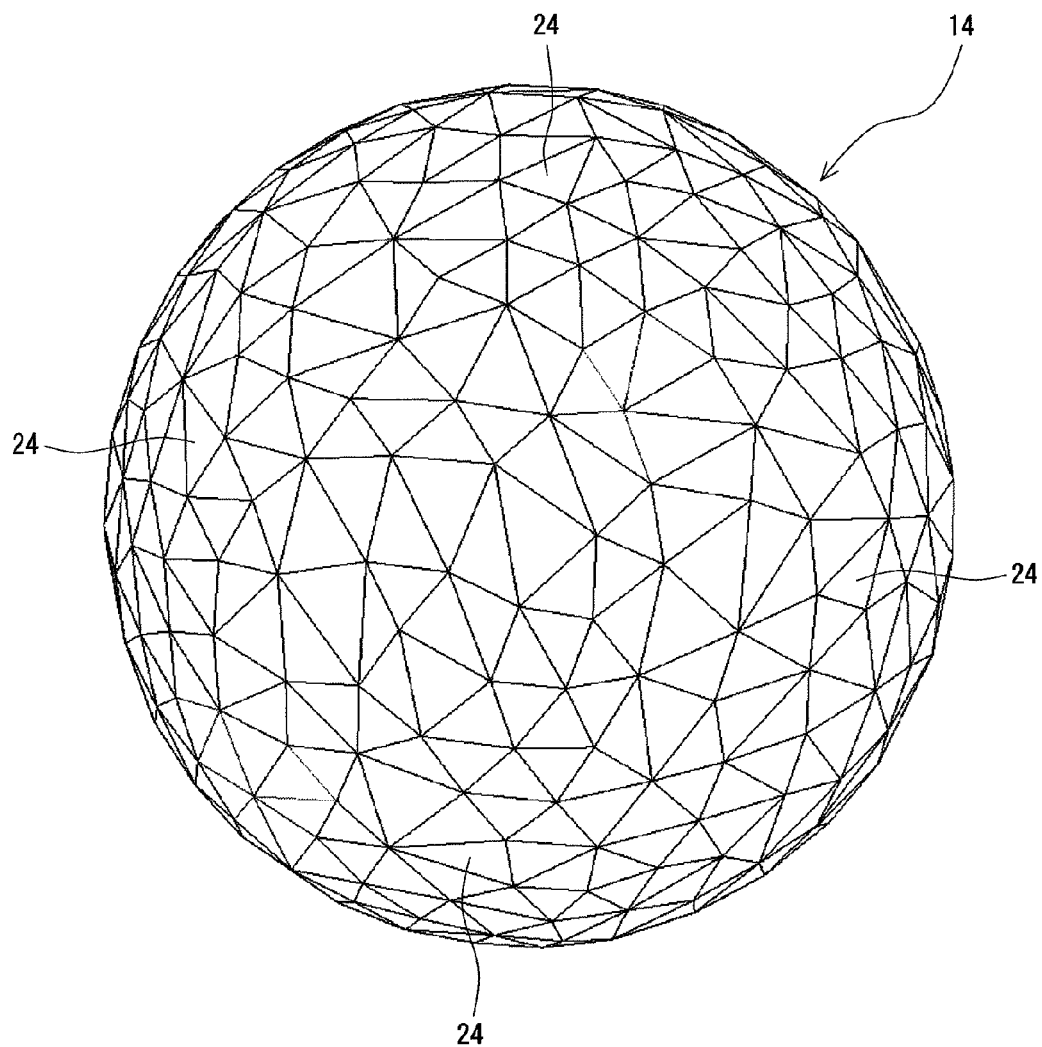
FIG. 14 is a front view showing a state where the phantom sphere shown in FIG. 4 is divided into Delaunay regions.

In this method, arbitrary three points 12 are selected from a large number of the points 12. A triangle whose vertices are these three points 12 is assumed. The circumcircle of the triangle is assumed. When none of the points 12 other than these three points 12 are included in the circumcircle, the triangle is determined as a Delaunay region. For all combinations of three points 12, this determination is performed. Because of this, the entire surface of the phantom sphere 14 is divided into a large number of Delaunay regions. FIG. 14 shows a state where the phantom sphere 14 shown in FIG. 4 is divided into Delaunay regions 24.

Figure 15:
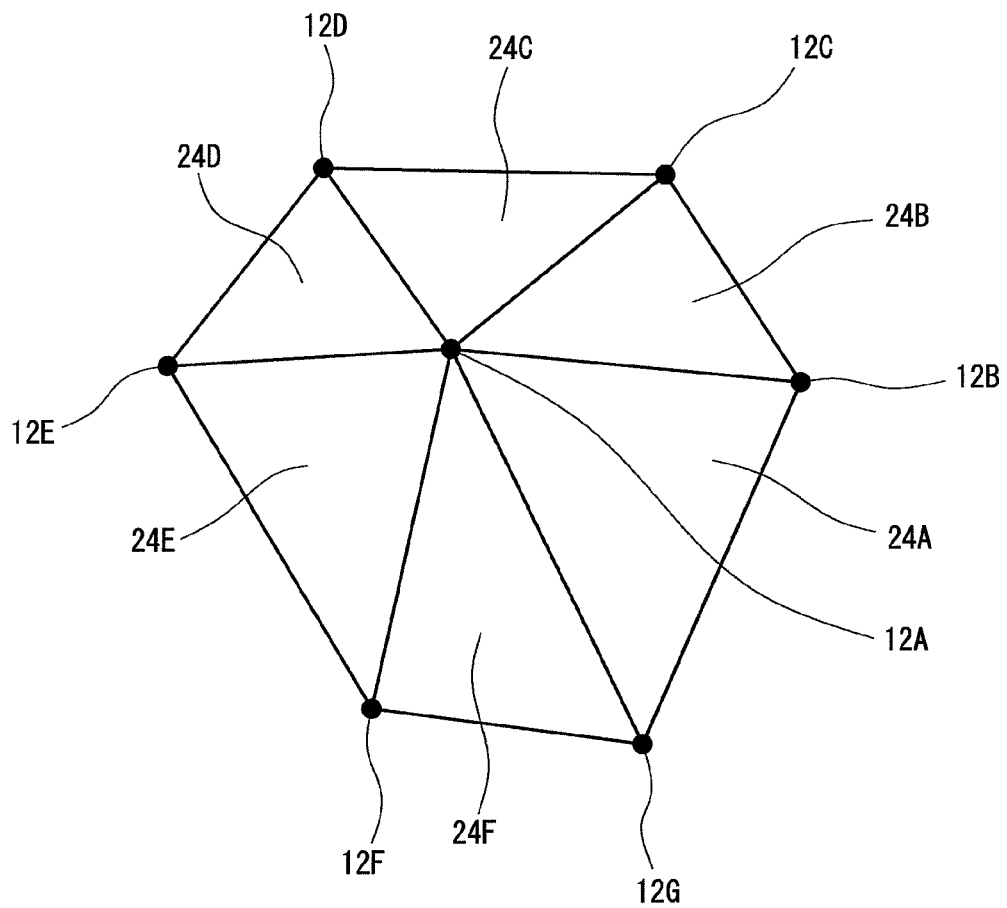
FIG. 15 is a partially enlarged view of the phantom sphere in FIG. 14.

FIG. 15 shows a portion of the phantom sphere 14 in FIG. 14. FIG. 15 shows seven points 12A to 12G. FIG. 15 also shows six Delaunay regions 24A to 24F. Each Delaunay region 24 is used for determining whether or not a point 12 and another point 12 are adjacent to each other. One vertex 12 of a Delaunay region 24 and another vertex 12 of this Delaunay region 24 are regarded as being adjacent to each other.

The point 12B is a vertex of the Delaunay region 24B, and the point 12A is also a vertex of the Delaunay region 24B. Thus, the point 12B is adjacent to the point 12A. The point 12C is a vertex of the Delaunay region 24C, and the point 12A is also a vertex of the Delaunay region 24C. Thus, the point 12C is adjacent to the point 12A. The point 12D is a vertex of the Delaunay region 24D, and the point 12A is also a vertex of the Delaunay region 24D. Thus, the point 12D is adjacent to the point 12A. The point 12E is a vertex of the Delaunay region 24E, and the point 12A is also a vertex of the Delaunay region 24E. Thus, the point 12E is adjacent to the point 12A. The point 12F is a vertex of the Delaunay region 24F, and the point 12A is also a vertex of the Delaunay region 24F. Thus, the point 12F is adjacent to the point 12A. The point 12G is a vertex of the Delaunay region 24A, and the point 12A is also a vertex of the Delaunay region 24A. Thus, the point 12G is adjacent to the point 12A. Other than the points 12B to 12G, there is no point 12 adjacent to the point 12A. Hereinafter, the point 12A is referred to as reference point, and the points 12B to 12G are referred to as adjacent points.

Figure 16:
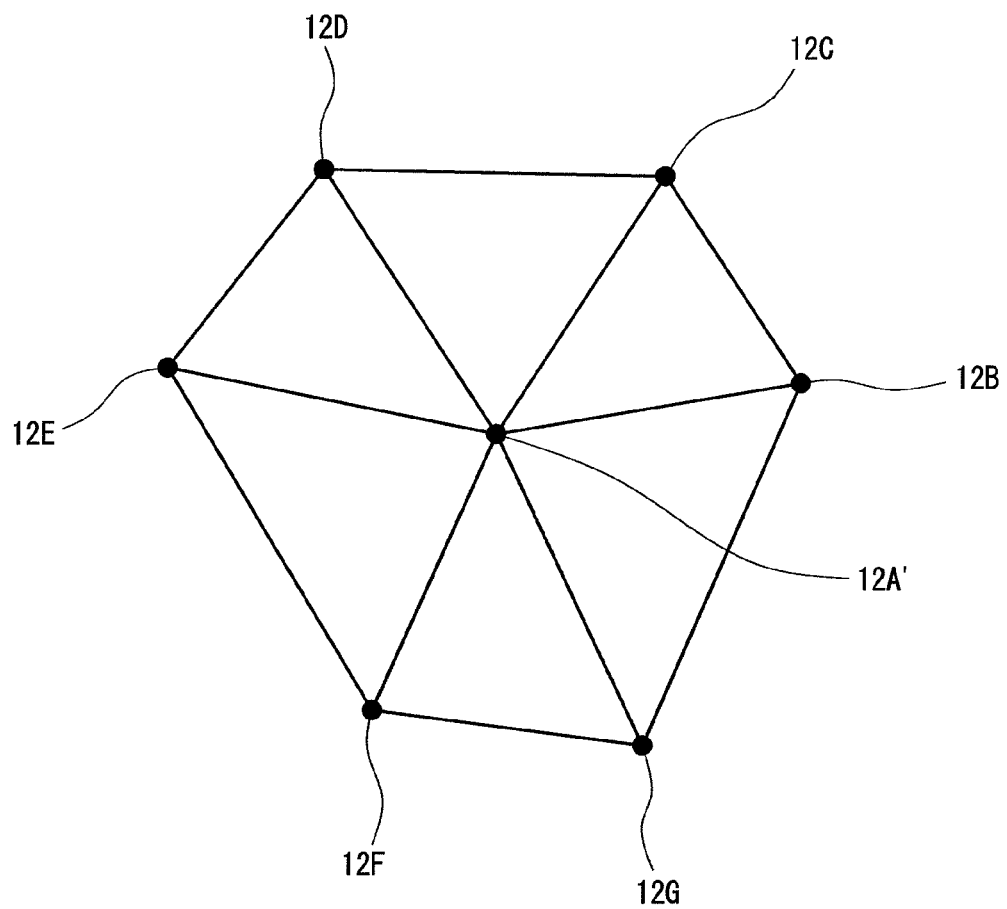
FIG. 16 is a partial front view of the phantom sphere after replacement for a reference point.

The coordinates of these adjacent points 12B to 12G are averaged. The coordinate of the reference point 12A is replaced with the obtained average. A reference point 12A' resulting from the replacement is shown in FIG. 16. In FIG. 15, the distance between the point 12D and the point 12A is small. In FIG. 16, there is no point 12 whose distance to the point 12A' is small.

Figure 17:
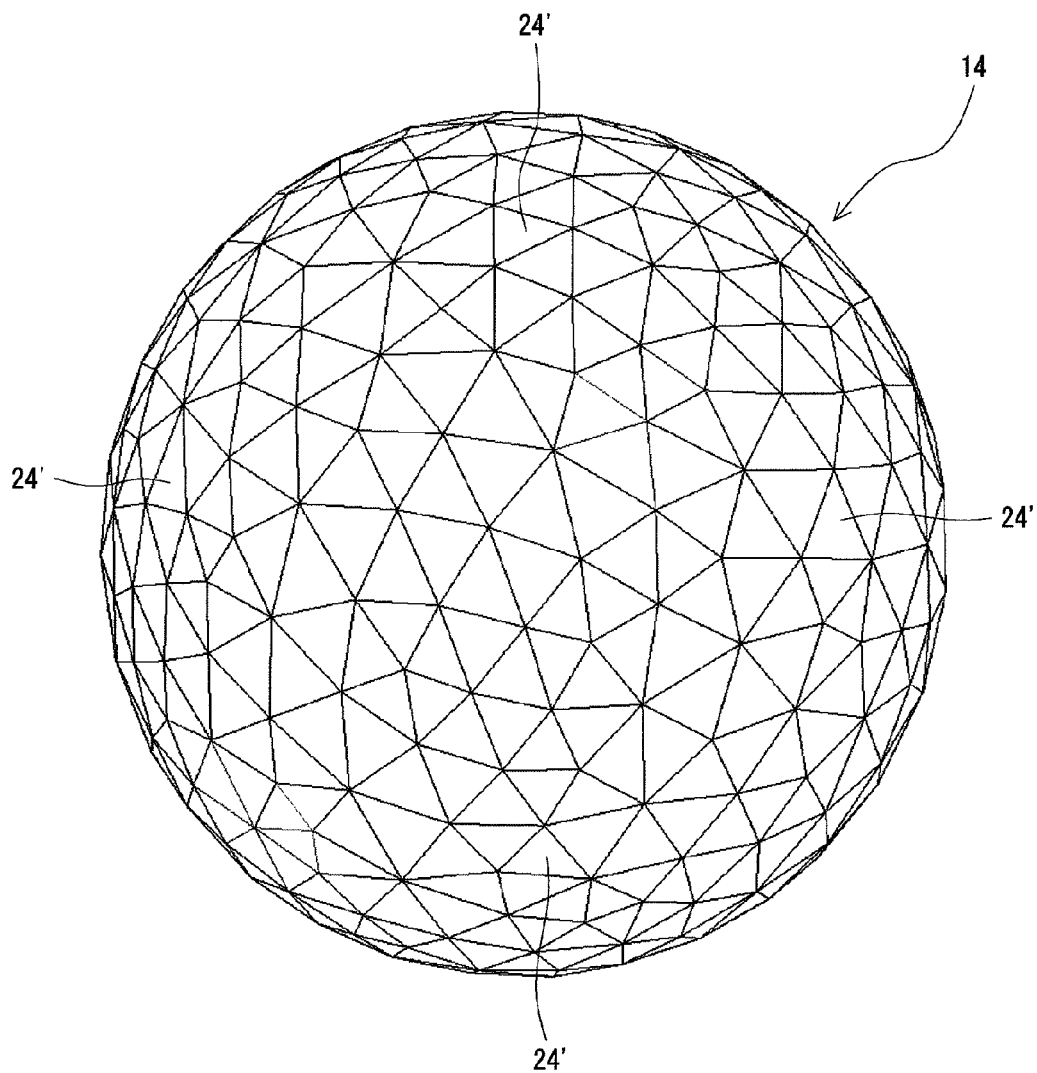
FIG. 17 is a front view showing a state where the phantom sphere after replacement for reference points is divided into Delaunay regions.
Figure 18:
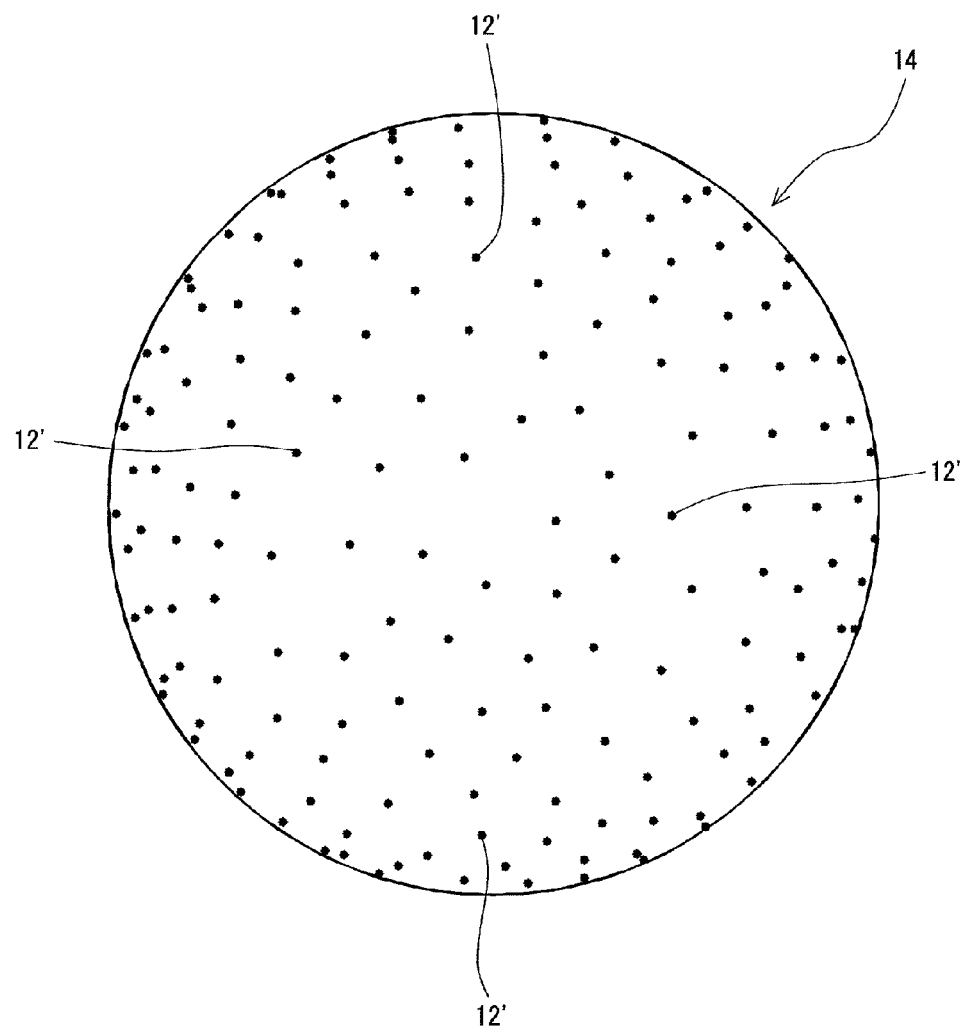
FIG. 18 is a front view of the phantom sphere with reference points resulting from the replacement.
Figure 19:
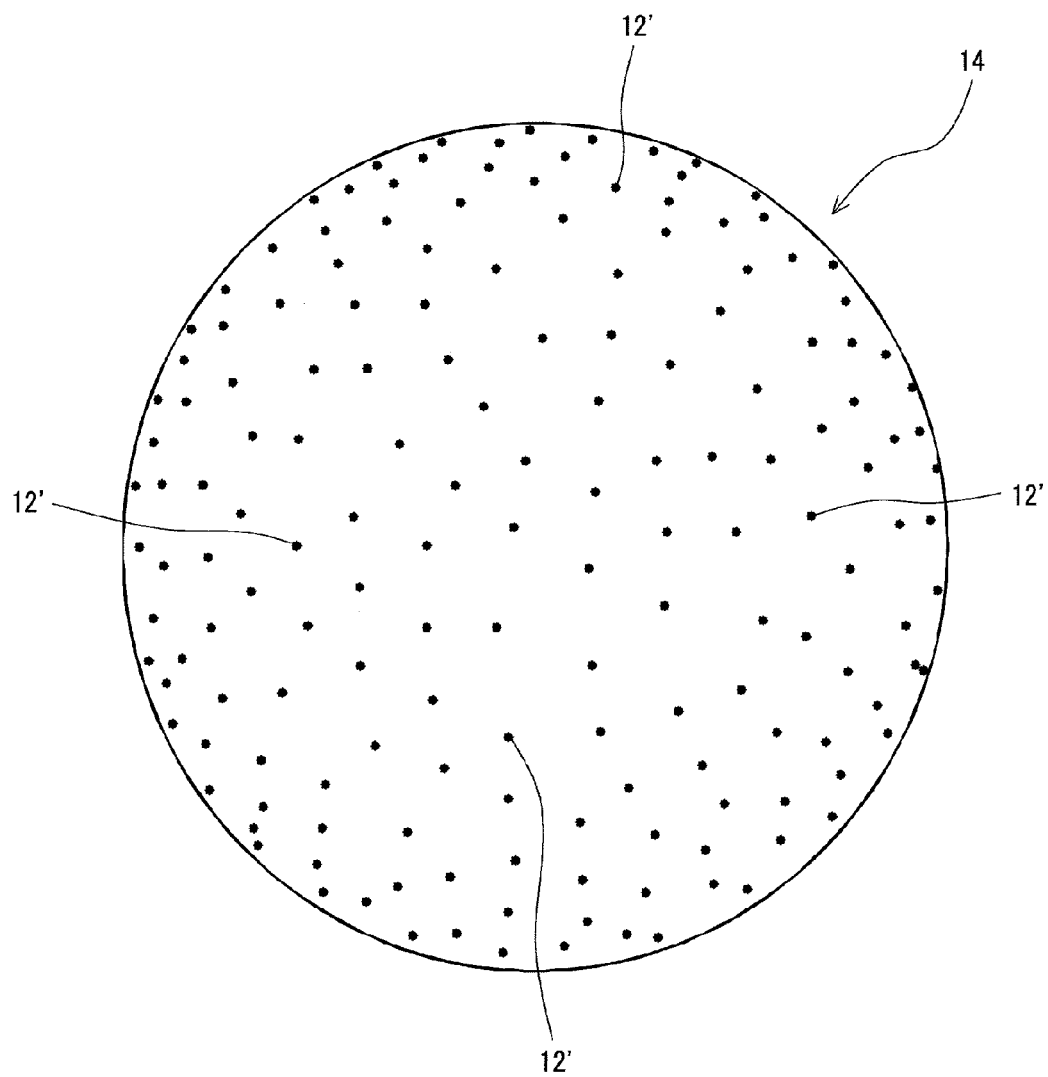
FIG. 19 is a plan view of the phantom sphere in FIG. 18.

For all the points 12 on the surface of the phantom sphere 14, such replacement is performed. The phantom sphere 14 after the replacement is shown in FIGS. 17 to 19. FIG. 17 shows Delaunay regions 24' based on points 12' resulting from the replacement. FIGS. 18 and 19 show the points 12' resulting from the replacement. On the basis of these points 12' and by the method shown in FIG. 6, the diameters of the dimples 8 are decided. By this decision, the dimple pattern shown in FIGS. 12 and 13 is obtained. As is obvious from the comparison of FIGS. 2 and 12, the occupation ratio can be increased by the corrections of the coordinates.

EXAMPLES

A pattern of Example 1 shown in FIGS. 2 and 3 was designed. The pattern has 324 dimples. A pattern of Example 2 shown in FIGS. 12 and 13 was designed. The pattern has 324 dimples.

Figure 24:
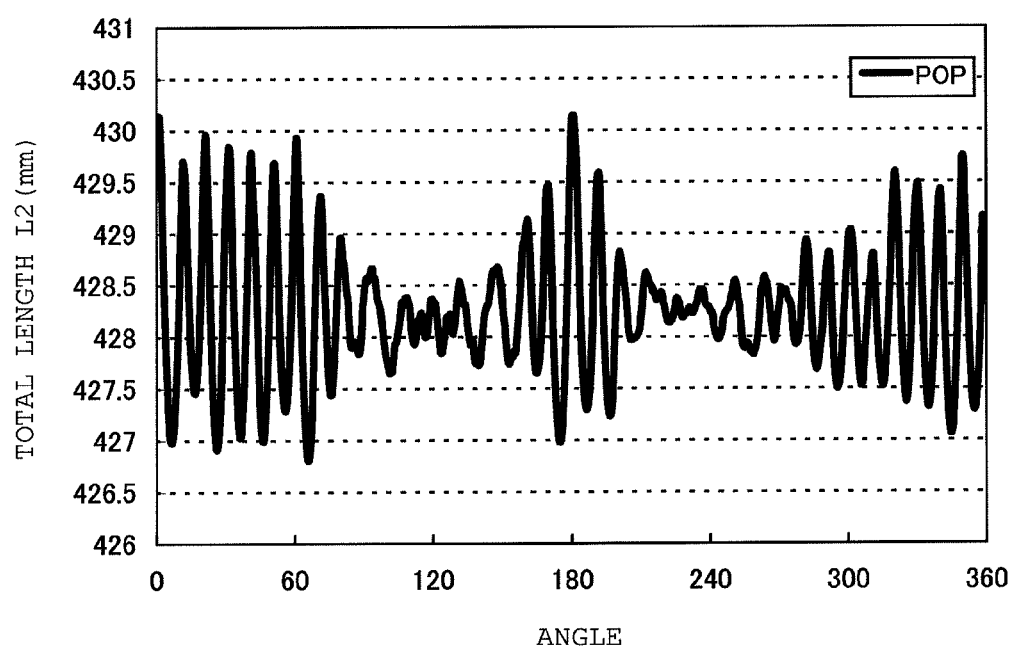
FIG. 24 is a graph showing an evaluation result of the golf ball according to Comparative Example 1.
Figure 25:
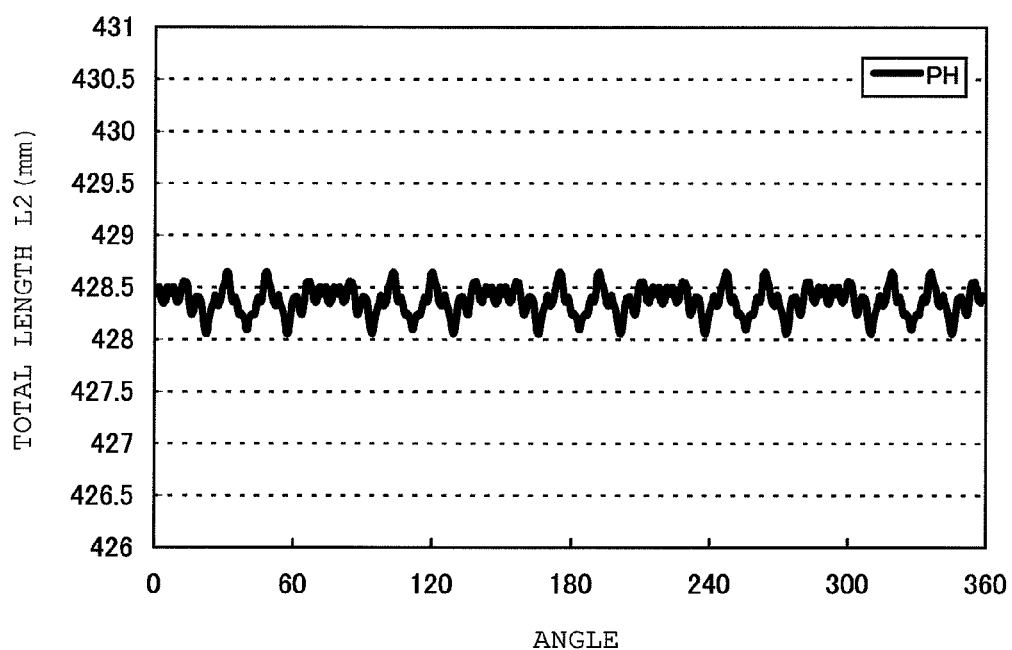
FIG. 25 is a graph showing another evaluation result of the golf ball according to Comparative Example 1.

Furthermore, a pattern of Comparative Example 1 shown in FIGS. 24 and 25 was designed. The pattern has dimples A each having a diameter of 4.00 mm, dimples B each having a diameter of 3.70 mm, dimples C each having a diameter of 3.40 mm, and dimples D each having a diameter of 3.20 mm. A cross-sectional shape of each dimple is a circular arc. The details of the dimples are as follows.

| Type | Number | Diameter (mm) | Depth (mm) | Volume (mm$^3$) |
|---|---|---|---|---|
| A | 120 | 4.00 | 0.1532 | 0.964 |
| B | 152 | 3.70 | 0.1532 | 0.825 |
| C | 60 | 3.40 | 0.1532 | 0.697 |
| D | 60 | 3.20 | 0.1532 | 0.618 |

By the aforementioned method, fluctuation ranges Ro and Rh of each pattern were calculated. The results are shown in Table 1 below.

TABLE 1

Results of Evaluation

Figure 20:
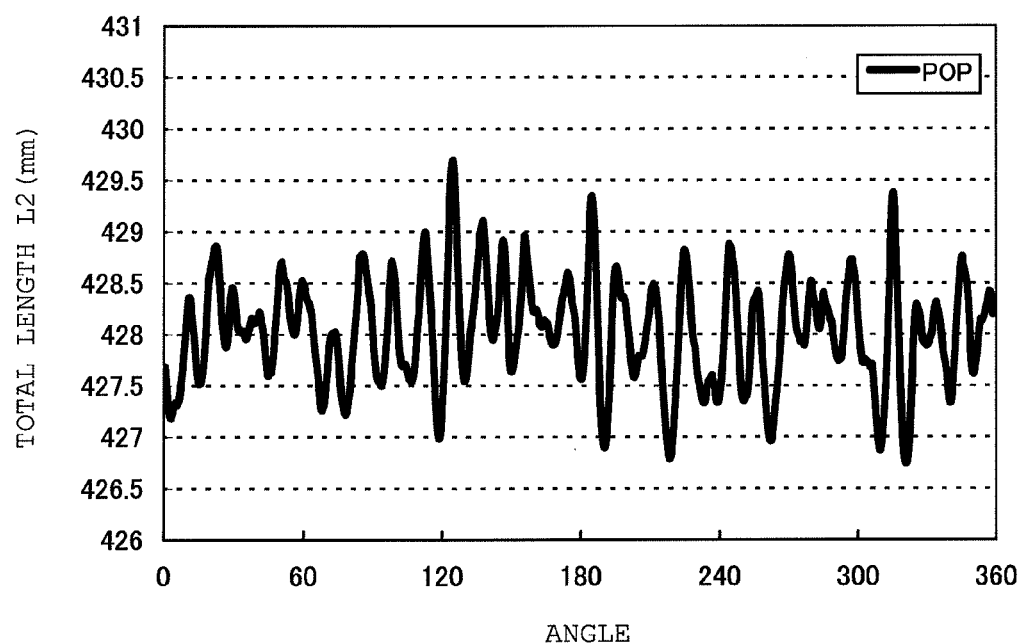
FIG. 20 is a graph showing an evaluation result of a golf ball according to Example 2 of the present invention.
Figure 21:
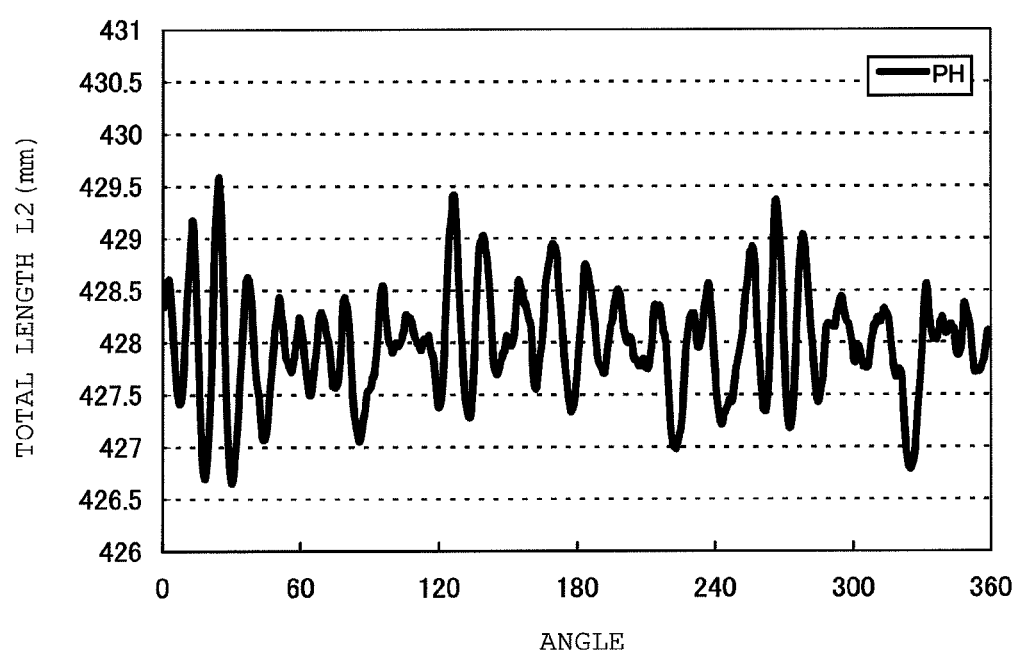
FIG. 21 is a graph showing another evaluation result of the golf ball according to Example 2 of the present invention.
Figure 22:
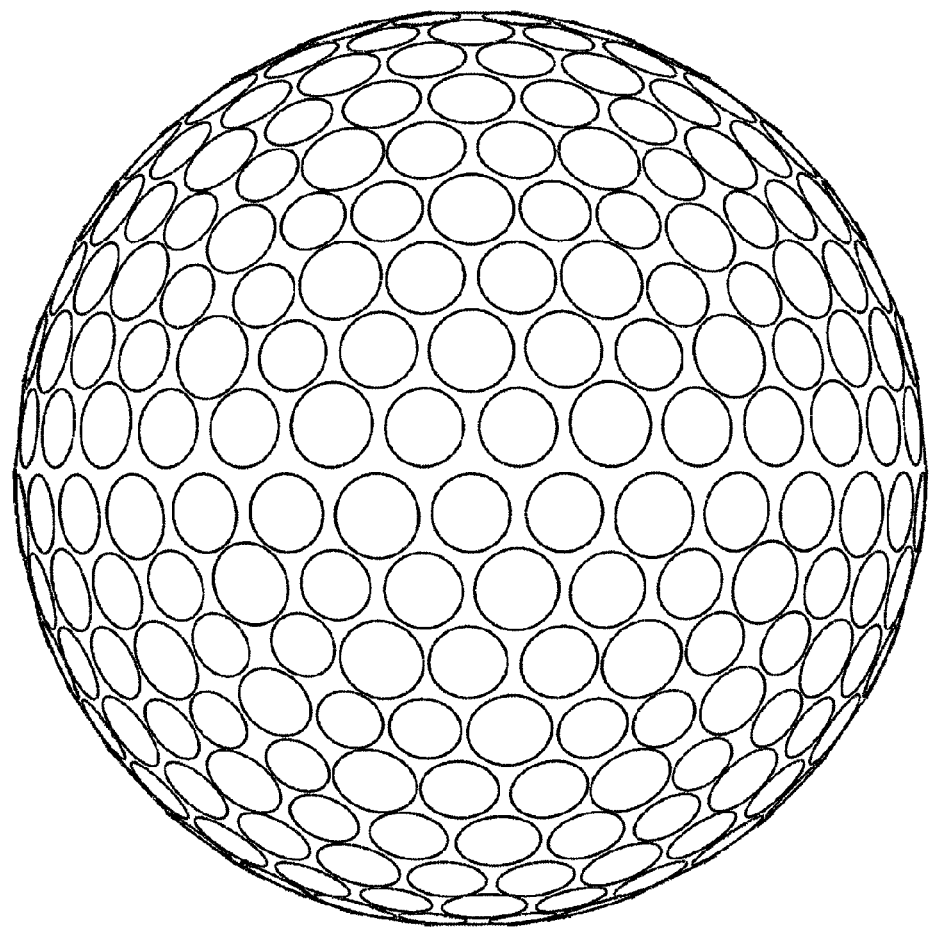
FIG. 22 is a front view of a golf ball according to Comparative Example 1.
Figure 23:
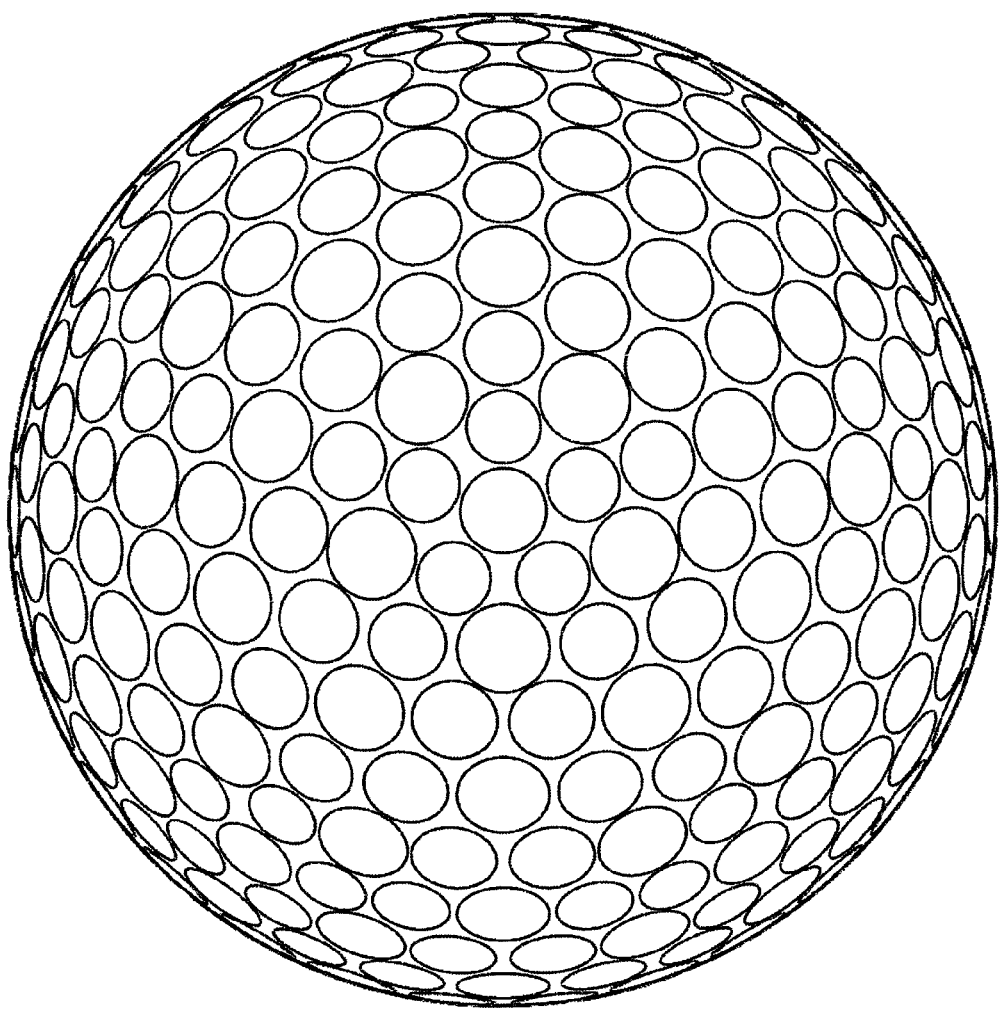
FIG. 23 is a plan view of the golf ball in FIG. 22.

| | | Example 1 | Example 2 | Compara. Example 1 |
|---|---|---|---|---|
| Front view | | FIG. 2 | FIG. 12 | FIG. 22 |
| Plan view | | FIG. 3 | FIG. 13 | FIG. 23 |
| Occupation ratio (%) | | 63.6 | 74.5 | 73.4 |
| Dimple depth (mm) | | 0.1749 | 0.1502 | 0.1532 |
| Total volume (mm$^3$) | | 320 | 320 | 320 |
| POP rotation | Graph | FIG. 10 | FIG. 20 | FIG. 24 |
| | Ro (mm) | 2.628 | 2.958 | 3.343 |
| PH rotation | Graph | FIG. 11 | FIG. 21 | FIG. 25 |
| | Rh (mm) | 2.707 | 2.938 | 0.595 |
| dR (mm) | | 0.079 | 0.020 | 2.748 |

As shown in Table 1, dR of each of the patterns of Examples 1 and 2 is small. From the results of evaluation, advantages of the present invention are clear.

The dimple pattern described above is applicable to a one-piece golf ball, a multi-piece golf ball, and a thread-wound golf ball, in addition to a two-piece golf ball. The above descriptions are merely for illustrative examples, and various modifications can be made without departing from the principles of the present invention.

What is claimed is:

1. A process for designing a dimple pattern of a golf ball, the process comprising the steps of:
   (1) establishing an initial point on a surface of a phantom sphere;
   (2) randomly arranging a plurality of points on the surface of the phantom sphere, wherein the step (2) includes the steps of:
      (2.1) generating random numbers;
      (2.2) deciding a coordinate on the surface of the phantom sphere on the basis of the random numbers;
      (2.3) calculating a distance between a point having the coordinate and a point already on the surface of the phantom sphere closest to the point having the coordinate;
      (2.4) recognizing the point having the coordinate as a point present on the surface of the phantom sphere when the distance is within a predetermined range;
      (2.5) repeating steps (2.1)-(2.4) until a number of points on the surface of the phantom sphere reaches a predetermined number;
      (2.6) regarding one point on the surface of the phantom sphere as a reference point;
      (2.7) deciding a plurality of adjacent points which are adjacent to the reference point;
      (2.8) calculating an average of coordinates of the plurality of adjacent points; and
      (2.9) replacing a coordinate of the reference point with a coordinate of the average;
   (3) calculating a distance between a first point and a second point which is a point closest to the first point;
   (4) deciding a radius on the basis of the distance;
   (5) assuming a circle which has a center at the first point and has the radius;
   (6) assuming a dimple whose contour coincides with the circle;
   (7) repeating steps (3)-(6) for all points on the phantom sphere; and
   (8) making said dimple pattern based on said steps (2)-(6).

2. The process according to claim 1, wherein the step (2.7) includes the steps of:
- (2.7.1) assuming a large number of triangles by a Delaunay triangulation using all points on the surface of the phantom sphere; and
- (2.7.2) regarding other vertices of a triangle whose vertex is the reference point, as the adjacent points.

3. The process according to claim 1, wherein, at the step (4), half of the distance is set as the radius.

\* \* \* \* \*